US012750748B2

(12) United States Patent
Jung

(10) Patent No.: US 12,750,748 B2
(45) Date of Patent: Sep. 29, 2026

(54) METHOD AND APPARATUS FOR RE-DERIVING CELL RESELECTION PRIORITY IN SLICE-BASED CELL RESELECTION IN NEXT-GENERATION MOBILE COMMUNICATION SYSTEM

(71) Applicant: Samsung Electronics Co., Ltd., Gyeonggi-do (KR)

(72) Inventor: Sangyeob Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 606 days.

(21) Appl. No.: 18/350,370

(22) Filed: Jul. 11, 2023

(65) Prior Publication Data

US 2024/0015625 A1 Jan. 11, 2024

(30) Foreign Application Priority Data

Jul. 11, 2022 (KR) ........................ 10-2022-0085289

(51) Int. Cl.
*H04W 36/00* (2009.01)
*H04W 36/24* (2009.01)
*H04W 36/36* (2009.01)

(52) U.S. Cl.
CPC ........... *H04W 36/13* (2023.05); *H04W 36/24* (2013.01); *H04W 36/36* (2013.01)

(58) Field of Classification Search
CPC ..... H04W 36/13; H04W 36/24; H04W 36/36; H04W 48/20; H04W 48/18; H04W 48/08; H04W 60/00; H04W 76/10
USPC ........................................... 370/331; 455/312
See application file for complete search history.

(56) References Cited

U.S. PATENT DOCUMENTS

2015/0195755 A1 7/2015 Gulati et al.
2016/0255563 A1 9/2016 Callender et al.
2018/0352508 A1 12/2018 Fujishiro et al.
2023/0055788 A1 2/2023 Jung et al.
2025/0184841 A1* 6/2025 Liu ........................ H04W 36/08
2025/0393079 A1* 12/2025 Liu ...................... H04W 74/006

FOREIGN PATENT DOCUMENTS

WO WO 2014/056675 4/2014

OTHER PUBLICATIONS

3GPP TS 38.304 V17.1.0 (Jun. 2022) (Year: 2022).*
Huawei, HiSilicon (Rapporteur), "Corrections to TS 38.331 for RAN slicing", 3GPP TSG-RAN WG2 Meeting #118-e R2-2206172 Electronic, May 9-20, 2022, pp. 1203.

(Continued)

*Primary Examiner* — Marcos Batista
(74) *Attorney, Agent, or Firm* — The Farrell Law Firm, P.C.

(57) ABSTRACT

The disclosure relates to a fifth generation (5G) or sixth generation (6G) communication system for supporting higher data rates. A method performed by a terminal performing a slice-based cell reselection in a wireless communication system is provided. The method includes obtaining information on a network slice access stratum group (NSAG) from a non-access stratum (NAS), in case that a cell in a frequency fulfils cell reselection criteria and does not support the NSAG, identifying whether the cell supports at least one NSAG other than the NSAG, and rederiving a reselection priority for the frequency based on a result of the identification.

16 Claims, 14 Drawing Sheets

(56) References Cited

OTHER PUBLICATIONS

NEC, "38.304 CR Corrections on slice-based cell reselection", 3GPP TSG-RAN WG2 Meeting #118e R2-2206845 Electronic meeting, May 9-20, 2022, pp. 15.
International Search Report dated Oct. 10, 2023 issued in counterpart application No. PCT/KR2023/009847, 8 pages.
3GPP TS 38.304 V17.1.0, (Jun. 2022) pp. 50.
NEC (Rapporteur), "Report from [AT118-e][242][Slicing] Finalizing Idle mode for RAN Slicing (NEC)", R2-2206185, 3GPP TSG-RAN WG2 Meeting #118 Electronic, May 9-20, 2022, 23 pp.
Ericsson, "Discussion and Way Forward on Network Slice AS Groups", R3-223409, 3GPP TSG-RAN WG3 Meeting #116-e, May 9-19, 2022, 8 pages.
Samsung, "Issues with Slice Specific Cell Reselection", R2-2208519, 3GPP TSG-RAN WG2 Meeting #119-e, Aug. 17-29, 2022, 8 pages.
European Search Report dated Aug. 27, 2025 issued in counterpart application No. 23839927.3-1206, 13 pages.

* cited by examiner

METHOD AND APPARATUS FOR RE-DERIVING CELL RESELECTION PRIORITY IN SLICE-BASED CELL RESELECTION IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2022-0085289, filed on Jul. 11, 2022, in the Korean Intellectual Property Office, the disclosure of which is incorporated herein by reference in its entirety.

BACKGROUND

1. Field

The disclosure relates generally to a mobile communication system, and more particularly, to a method for re-deriving a cell reselection priority in slice-based cell reselection in a next-generation mobile communication system.

2. Description of Related Art 5G mobile communication technologies define broad frequency bands such that high transmission rates and new services are possible and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A mobile communication system may be configured with a network supporting network slicing. That is, a single physical network may be configured and managed as logically separated network slices (hereinafter, referred to as slices). A mobile communication service provider may provide a dedicated network specialized for various services with distinct characteristics. Each network slice may have different types and amounts of required resources according to service characteristics, and the mobile communication system may guarantee resources required by each network slice. For example, control plane signaling may frequently occur in a network slice providing a voice phone service, for which the network slice may be configured with specialized network function (NF). Large-scale data traffic may frequently occur in a network slice providing Internet data service, for which the network slice may be configured with a specialized NF. In the 5G system defined by the third generation partnership project (3GPP), one network slice may be referred to as single network slice selection assistance information (S-NSSAI), which is composed of a slice/service type (SST) value and a slice differentiator (SD) value. The SST may represent characteristics such as eMBB, IoT, URLLC, and V2X of a service supported by a slice. The SD may be used as an additional identifier for a specific service referred to as SST.

A UE may access a mobile communication system to perform a registration procedure during which the UE may transmit information (hereinafter, referred to as requested NSSAI) on slices to be used to the mobile communication system. Such requested NSSAI may include one or more S-NSSAI values. The mobile communication system may authenticate the request of the UE and determine network slice information (hereinafter, referred to as allowed NSSAI) available to the UE when authentication is successful. Such allowed NSSAI may include one or more S-NSSAI values. The UE may receive the allowed NSSAI from the mobile communication system, may store the allowed NSSAI and use the allowed NSSAI in subsequent procedures.

However, the prior art is deficient in handling such network slices in cell reselection. Thus, there is a need in the art for a cell reselection procedure considering network slices.

SUMMARY

The present disclosure has been made to address at least the above problems and/or disadvantages and to provide at least the advantages described below.

Accordingly, an aspect of the present disclosure is to provide a method and apparatus for effectively and efficiently performing cell reselection considering network slices, in a wireless communication system.

In accordance with an aspect of the disclosure, a method performed by a terminal performing a slice-based cell reselection in a wireless communication system is provided. The method includes obtaining information on a network slice access stratum group (NSAG) from a non-access stratum (NAS), in case that a cell in a frequency fulfils cell reselection criteria and does not support the NSAG, identifying whether the cell supports at least one NSAG other than the NSAG, and rederiving a reselection priority for the frequency based on a result of the identification.

In accordance with an aspect of the disclosure, a terminal performing a slice-based cell reselection in a wireless communication system is provided. The terminal includes a transceiver and a controller coupled with the transceiver. The controller is configured to obtain information on an NSAG from a NAS, in case that a cell in a frequency fulfils cell reselection criteria and does not support the NSAG, identify whether the cell supports at least one NSAG other than the NSAG, and rederive a reselection priority for the frequency based on a result of the identification.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
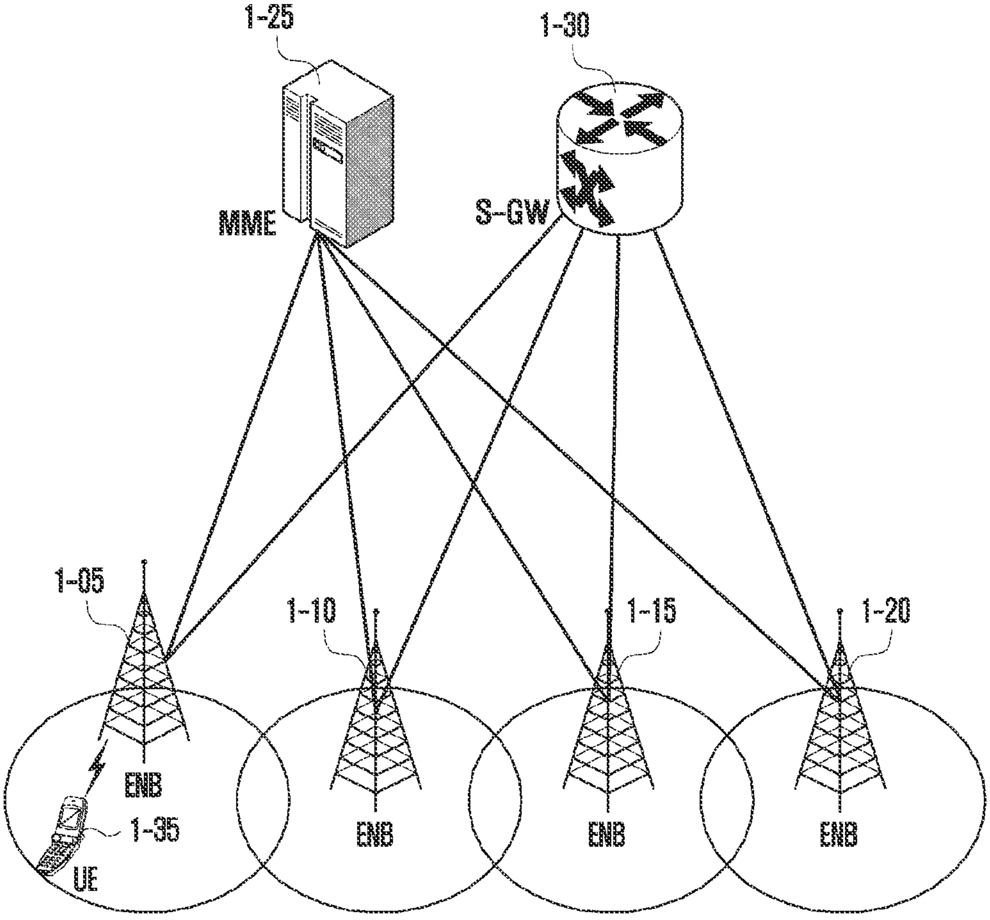
FIG. 1 illustrates the structure of an LTE system according to an embodiment.

Embodiments of the disclosure will be described in detail with reference to the accompanying drawings. Descriptions of well-known components and processing techniques are omitted for the sake of clarity and conciseness.

In the accompanying drawings, some elements may be exaggerated, omitted, or schematically illustrated. The size of each element does not completely reflect the actual size, and identical or corresponding elements are provided with identical reference numerals.

The disclosure is not limited to the embodiments set forth below, but may be implemented in various different forms. The embodiments are provided to completely disclose the disclosure and inform those skilled in the art of the scope of the disclosure. Throughout the specification, the same or like reference numerals designate the same or like elements.

Herein, the term "unit" refers to a software element or a hardware element, such as a field programmable gate array (FPGA) or an application specific integrated circuit (ASIC), which performs a predetermined function. However, the unit is not always limited to software or hardware. The unit may be constructed either to be stored in an addressable storage medium or to execute one or more processors. Therefore, the unit includes software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units or may be implemented to reproduce one or more central processing units (CPUs) within a device or a security multimedia card.

The terms which will be described below are terms defined in consideration of the functions herein, and may be different according to users, intentions of the users, or customs. Therefore, the definitions of the terms should be made based on the contents throughout the specification.

Herein, terms for identifying access nodes, referring to network entities, referring to messages, referring to interfaces between network entities, and referring to various identification information are illustratively used for the sake of descriptive convenience. Therefore, the disclosure is not limited by the terms as used below, and other terms referring to subjects having equivalent technical meanings may be used.

Terms and names defined in the 3rd generation partnership project long term evolution (3GPP LTE) standards will be used for the sake of descriptive convenience. However, the disclosure is not limited by these terms and names, and may be applied in the same manner to systems that conform to other standards. Herein, the term eNB may be interchangeably used with the term gNB in reference to a base station.

FIG. 1 illustrates the structure of an LTE system according to an embodiment.

Referring to FIG. 1, a radio access network of the LTE system includes a next-generation base station (evolved node B, hereinafter, ENB, Node B or base station) 1-05, 1-10, 1-15, and 1-20, a mobility management entity (MME) 1-25, and a serving-gateway (S-GW) 1-30. A user equipment (hereinafter, UE or terminal) 1-35 accesses an external network through the ENBs 1-05 to 1-20 and the S-GW 1-30.

In FIG. 1, the ENBs 1-05 to 1-20 correspond to the existing Node B of a UMTS system. The ENBs are connected to the UE 1-35 through a radio channel and perform a more complex role than the existing Node B. In the LTE system, because all user traffic, including real-time services such as voice over IP (VoIP) through Internet protocol, may be serviced through shared channels, a device for scheduling by collecting state information such as buffer state of the UEs, available transmission power state, channel state, etc. is required, and the ENBs 1-05 to 1-20 are responsible for this. One ENB typically controls multiple cells. For example, in order to implement a transmission rate of 100 Mbps, the LTE system uses orthogonal frequency division multiplexing (OFDM) in a 20 MHz bandwidth as a radio access technology. In addition, an adaptive modulation & coding (AMC) scheme determining a modulation scheme and a channel coding rate based on the channel state of the UE is applied. The S-GW 1-30 provides a data bearer and generates or removes the data bearer under the control of the MME 1-25, which controls various control functions as well as a mobility management function for the UE and is connected to a plurality of base stations.

Figure 2:
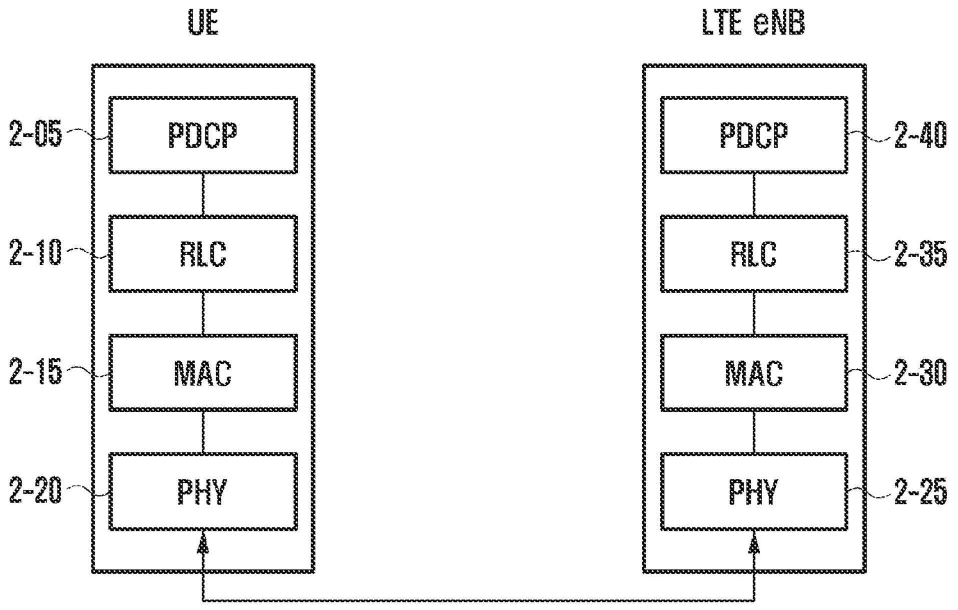
FIG. 2 illustrates a radio protocol structure in an LTE system according to an embodiment.

FIG. 2 illustrates a radio protocol structure in an LTE system according to an embodiment.

Referring to FIG. 2, the radio protocol of the LTE system consists of a packet data convergence protocol (PDCP) 2-05 and 2-40, a radio link control (RLC) 2-10 and 2-35, and a medium access control (MAC) 2-15 and 2-30 in the UE and ENB, respectively. The PDCP 2-05 and 2-40 perform operations of IP header compression/decompression, etc. Main functions of the PDCP include header compression and decompression (robust header compression (ROHC) only), transfer of user data, in-sequence delivery of upper layer PDUs at PDCP re-establishment procedure for RLC AM, for split bearers in DC (only support for RLC AM): PDCP PDU routing for transmission and PDCP PDU reordering for reception, duplicate detection of lower layer SDUs at PDCP re-establishment procedure for RLC AM, retransmission of PDCP SDUs at handover and, for split bearers in DC, of PDCP PDUs at PDCP data-recovery procedure, for RLC AM, ciphering and deciphering, and timer-based SDU discard in the UL.

The RLC 2-10 and 2-35 perform ARQ operation by reconfiguring a PDCP packet data unit (PDU) to an appropriate size. Main functions of the RLC include transfer of upper layer PDUs, error correction through ARQ (only for AM data transfer), concatenation, segmentation and reassembly of RLC SDUs (only for UM and AM data transfer), re-segmentation of RLC data PDUs (only for AM data transfer), reordering of RLC data PDUs (only for UM and AM data transfer), duplicate detection (only for UM and AM data transfer), protocol error detection (only for AM data transfer), RLC SDU discard (only for UM and AM data transfer), and RLC re-establishment.

The MACs 2-15 and 2-30 are connected to several RLC layers configured in one UE, and perform operations of multiplexing RLC PDUs into MAC PDUs and demultiplexing RLC PDUs from MAC PDUs. Main functions of the MAC include mapping between logical channels and transport channels, multiplexing/demultiplexing of MAC SDUs belonging to one or different logical channels into/from transport blocks (TBs) delivered to/from the physical layer on transport channels, scheduling information reporting, error correction through a HARQ, priority handling between logical channels of one UE, priority handling between UEs by means of dynamic scheduling, MBMS service identification, transport format selection, and padding.

The physical layers 2-20 and 2-25 channel-code and modulate upper layer data, create OFDM symbols and transmits the OFDM symbols through a radio channel, or demodulate and channel-decode the OFDM symbols received through the radio channel and transmits the symbols to upper layers.

Figure 3:
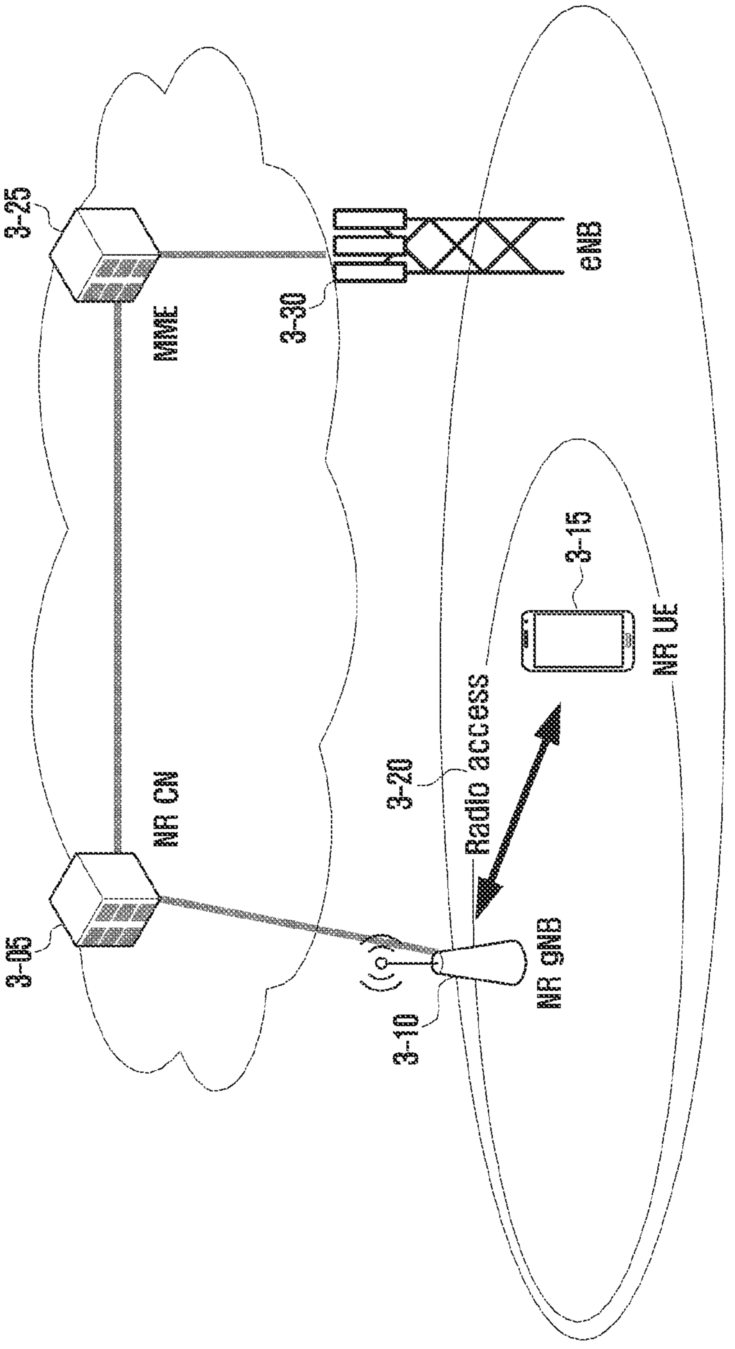
FIG. 3 illustrates the structure of a next-generation mobile communication system according to an embodiment.

FIG. 3 illustrates the structure of a next-generation mobile communication system according to an embodiment.

Referring to FIG. 3, a radio access network of the next-generation mobile communication system (hereinafter, NR or 5G) is composed of an NR gNB or NR base station 3-10 and a new radio core network (NR CN) 3-05. A new radio user equipment (hereinafter, NR UE or terminal) 3-15 accesses an external network through an NR gNB 3-10 and an NR CN 3-05.

In FIG. 3, the NR gNB 3-10 corresponds to an eNB of the existing LTE system. The NR gNB is connected to the NR UE 3-15 through a radio channel and may provide a service superior to that of the existing Node B. In the next-generation mobile communication system, because all user traffic is serviced through the shared channel, a device for scheduling by collecting state information such as a buffer state of the UEs, an available transmission power state, a channel state, etc. is required, and is performed by the NR NB 3-10. One NR gNB usually controls multiple cells. A bandwidth greater than or equal to the existing maximum bandwidth may be applied in order to implement ultra-high-speed data transmission compared with current LTE, and additional beamforming technology may be grafted by using OFDM as a radio access technology. In addition, an AMC scheme for determining a modulation scheme and a channel coding rate according to the channel state of the UE is applied. The NR CN 3-05 performs functions such as mobility support, bearer configuration, QoS configuration, and a mobility management function for the UE, and is connected to a plurality of base stations. In addition, the next-generation mobile communication system may be linked with the existing LTE system, and the NR CN is connected to the MME 3-25 through a network interface. The MME is connected to the existing base station eNB 3-30.

Figure 4:
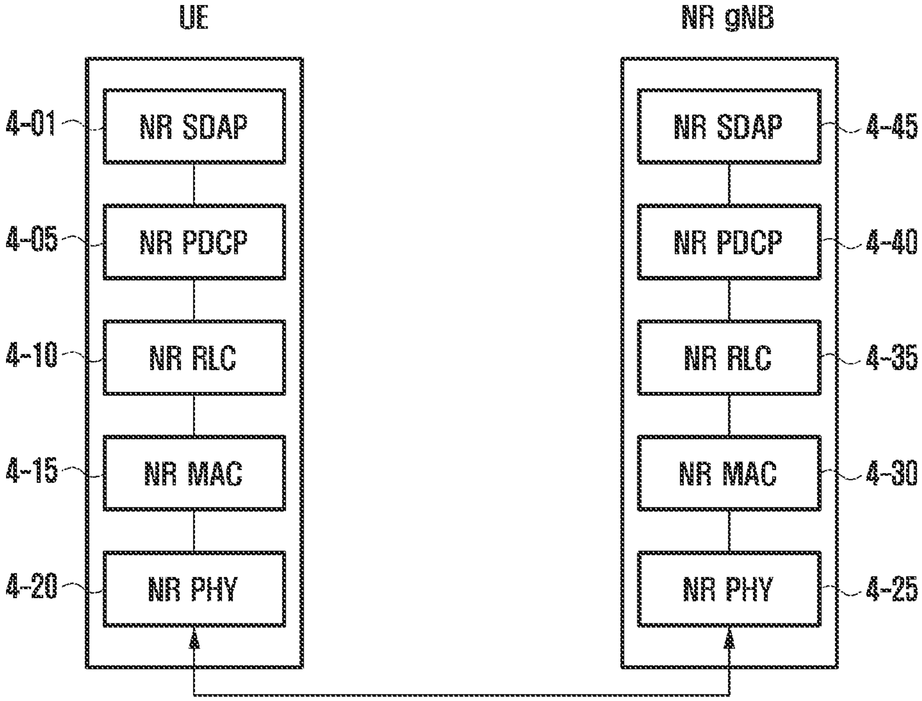
FIG. 4 illustrates a radio protocol structure of a next-generation mobile communication system according to an embodiment.

FIG. 4 illustrates a radio protocol structure of a next-generation mobile communication system according to an embodiment.

Referring to FIG. 4, a radio protocol of the next-generation mobile communication system consists of an NR service data adaption protocol (NR SDAP) 4-01 and 4-45, NR PDCP 4-05 and 4-40, NR RLC 4-10 and 4-35, and NR MAC 4-15 and 4-30 in a UE and an NR base station, respectively.

Main functions of the NR SDAPs 4-01 and 4-45 may include transfer of user plane data, mapping between a QoS flow and a DRB for both DL and UL, marking QoS flow ID in both DL and UL packets, and reflective QoS flow to DRB mapping for the UL SDAP PDUs.

With respect to the SDAP layer, the UE may be configured with an RRC message to determine whether to use a SDAP layer header or the function of the SDAP layer for each PDCP layer, for each bearer, or for each logical channel, and when the SDAP header is configured, the UE may instruct the UE to update or reconfigure mapping information for UL and DL QoS flows and data bearers with a non-access stratum (NAS) quality of service (QoS) reflected configuration 1-bit indicator (NAS reflective QoS) and an AS QoS reflected configuration 1-bit indicator (AS reflective QoS) of the SDAP header. The SDAP header may include QoS flow ID information indicating QoS. The QoS information may be used as data processing priority, scheduling information, etc. to support a smooth service.

Main function of the NR PDCP 4-05 and 4-40 may include header compression and decompression (ROHC only), transfer of user data, in-sequence delivery of upper layer PDUs, out-of-sequence delivery of upper layer PDUs, PDCP PDU reordering for reception, duplicate detection of lower layer SDUs, retransmission of PDCP SDUs, ciphering and deciphering, and timer-based SDU discard in the UL.

The reordering function of the NR PDCP may refer to reordering PDCP PDUs received from a lower layer in order based on a PDCP sequence number (SN), and may include a function to transmit data to the upper layer in the rearranged order or to directly transmit data without considering the order, to record lost PDCP PDUs by rearranging the order, to report the state of lost PDCP PDUs to the transmitting side, and to request retransmission for lost PDCP PDUs.

The main function of the NR RLC 4-10 and 4-35 may include transfer of upper layer PDUs, in-sequence delivery of upper layer PDUs, out-of-sequence delivery of upper layer PDUs, error correction through the ARQ, concatenation, segmentation and reassembly of RLC SDUs, re-segmentation of RLC data PDUs, reordering of RLC data PDUs, duplicate detection, protocol error detection, RLC SDU discard, and RLC re-establishment.

The in-sequence delivery of the NR RLC refers to sequentially delivering RLC SDUs received from a lower layer to an upper layer, may include a function to reassemble and deliver divided RLC SDUs when originally one RLC SDU is divided into several RLC SDUs and received, to rearrange received RLC PDUs based on RLC sequence number (SN) or PDCP sequence number (SN), to reorder and record lost RLC PDUs, to report the state of lost RLC PDUs to the transmitting side, a function to request retransmission of lost RLC PDUs, to sequentially deliver only the RLC SDUs before the lost RLC SDU to the upper layer when there is a missing RLC SDU, or to sequentially deliver all RLC SDUs received before the timer starts to the upper layer if a predetermined timer has expired even if there is a lost RLC SDU, or to sequentially deliver all RLC SDUs received so far to the upper layer if a predetermined timer has expired even if there is a lost RLC SDU. RLC PDUs may be processed in the order they are received (regardless of the order of serial numbers and sequence numbers, in the order of arrival) and delivered to the PDCP device out of order (out-of-sequence delivery), and when segments, segments stored in the buffer or to be received later are received, reconstructed into one complete RLC PDU, processed, and transmitted to the PDCP device. The NR RLC layer may not include a concatenation function, and the function may be performed by the NR MAC layer or replaced with a multiplexing function of the NR MAC layer.

The out-of-sequence delivery of the NR RLC device refers directly delivering RLC SDUs received from a lower layer to an upper layer regardless of order, and may include a function of reassembling and delivering when originally one RLC SDU is divided into several RLC SDUs and received, storing the RLC SN or PDCP SN of the received RLC PDUs, arranging the order, and recording the lost RLC PDUs.

The NR MACs 4-15 and 4-30 may be connected to several NR RLC layers configured in one UE, and the main function of the NR MAC may include mapping between logical channels and transport channels, multiplexing/demultiplexing of MAC SDUs, scheduling information reporting, error correction through the HARQ, priority handling between logical channels of one UE, priority handling between UEs by means of dynamic scheduling, MBMS service identification, transport format selection, and padding.

The NR PHY layer 4-20 and 4-25 may channel-code and modulate upper layer data, create OFDM symbols and transmits the OFDM symbols through a radio channel, or may demodulate and channel-decode the OFDM symbols received through the radio channel and transmits the symbols to upper layers.

Figure 5:
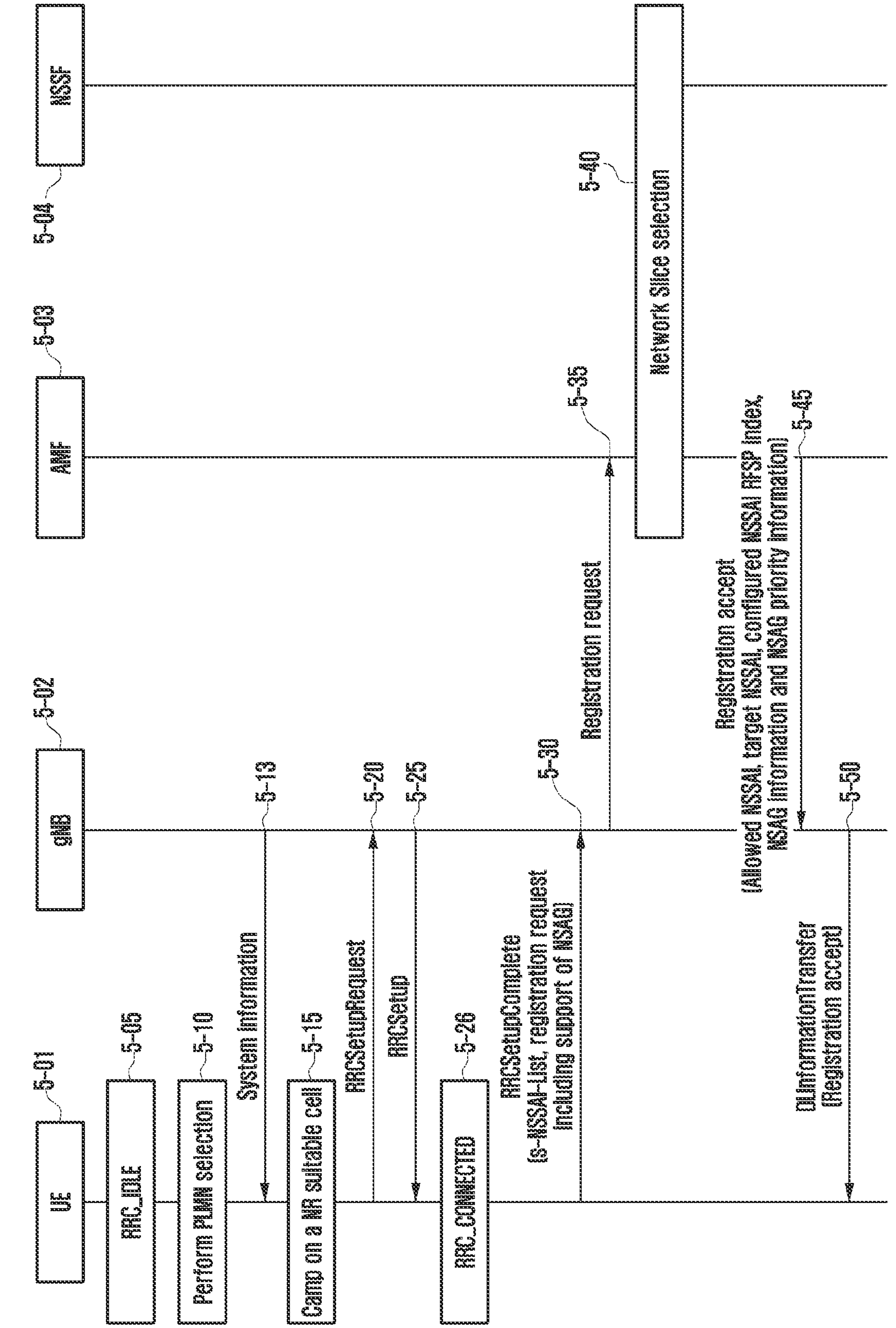
FIG. 5 illustrates a process in which a UE receives configuration of slice groups and slice group priorities through an access and mobility management function (AMF) in a next-generation mobile communication system according to an embodiment.

FIG. 5 illustrates a process in which a UE receives configuration of slice groups and slice group priorities through an AMF in a next-generation mobile communication system.

A slice group according to the disclosure may refer to one or a plurality of slices. The slice group may be referred to as a network slice AS group (NSAG). A UE supporting the NSAG may receive NSAG information and a priority value for each NSAG configured in an NAS message through AMF. The NSAG information may be configured for each tracking area (TA) and may include at least one of an NSAG identifier (NSAG-Id) for identifying each NSAG, mapping information on which NSAG a specific slice belongs to, and a tracking area identity (TAI) for each NSAG. TAIs may be included when each TA uses the same NSAG identifier but is composed of different slice(s). For example, when a TAI is not included in a specific NSAG, it may indicate that mapping of the same slice(s) is applied to all TAs belonging to the registration area (RA) of the UE.

Referring to FIG. 5, in step 5-05, a UE 5-01 may be in an RRC_IDLE mode.

In step 5-10, the RRC idle mode UE 5-01 may perform a public land mobile network (PLMN) selection process.

In step 5-13, the RRC idle mode UE 5-01 may obtain system information broadcast by the NR base station 5-02 and, in step 5-15, may camp-on to an NR suitable cell through a cell selection or cell reselection process.

The RRC idle mode UE 5-01 may perform an RRC connection establishment procedure with a camp-on cell. Specifically, in step 5-20, the UE 5-01 may transmit an RRC connection establishment request message (RRCSetupRequest) to the NR base station. In step 5-25, the NR base station 5-02 may transmit an RRC connection setup message to the UE 5-01. Upon receiving the RRC connection setup message, the UE 5-01 may apply the configuration information contained in the RRC connection setup message and transition to the RRC connected mode (RRC_CONNECTED) (5-26).

In step 5-30, the UE 5-01 transitioning to the RRC connected mode may transmit an RRC connection setup complete message to the NR base station 5-02. When an upper layer device provides one or more single network slice selection assistance information (S-NSSAI), the UE 5-01 may include an s-NSSAI-List in the RRC connection setup complete message with values provided by the upper layer device and transmit the message to the NR base station. The S-NSSAI-List is composed of one or more S-NSSAIs, and each S-NSSAI may be composed of SST (Slice/Service Type), or SST and SST-SD (Slice/Service Type and Slice Differentiator), and the ASN.1 structure may be expressed as illustrated below in Table 1.

TABLE 1

- S-NSSAI

The IE S-NSSAI (Single Network Slice Selection Assistance Information) identifies a Network Slice end to end and comprises a slice/service type and a slice differentiator, see TS 23.003.

S-NSSAI information element

```
-- ASN1START
-- TAG-S-NSSAI-START
    S-NSSAI ::=            CHOICE{
      sst                    BIT STRING (SIZE (8)),
      sst-SD                 BIT STRING (SIZE (32))
    }
    -- TAG-S-NSSAI-STOP
    -- ASN1STOP
```

S-NSSAI field descriptions sst
Indicates the S-NSSAI consisting of Slice/Service Type, see TS 23.003.
sst-SD
Indicates the S-NSSAI consisting of Slice/Service Type and Slice Differentiator, see TS 23.003.

In step 5-30, the UE 5-01 may contain an NAS message (DedicatedNAS-Message) in the RRC connection setup complete message (RRCSetupComplete) and transmit the same to the NR base station 5-02. For example, the NAS message may refer to a registration request message and may include information indicating that the UE 5-01 supports an NSAG or information indicating whether the UE 5-01 supports the NSAG.

In step 5-35, the NR base station 5-02 may forward the registration request message to the AMF 5-03.

In step 5-40, the network slicing selection function (NSSF) 5-04 may select a network slice that may be supported by 5G core and deliver the same to the AMF 5-03.

In step 5-45, the AMF 5-03 may contain at least one of NSAG information for one or a plurality of N-SSAIs and priority information for each NSAG in a registration accept message and transmits the same to the NR base station. The NSAG information may include at least one of a TA or TAI, and mapping information indicating which NSAG one or more slices belong to and an identifier for each NSAG (NSAG-Id). Up to 32 NSAGs may be configured for each PLMN, and the NSAG(s) may be unique for each PLMN. This information may be configured for each TA.

The NSAG information and NSAG priority information may also be provided in a UE configuration command message. In step 5-45, the registration accept message may contain allowed NSSAI and non-supportable NSSAI (Target NSSAI) among the NSSAIs requested by the UE 5-01 and transmit them to the NR base station. The message may also contain an Index to RAT/Frequency Slice Selection Priority (hereinafter, RFSP index) for each frequency/RAT.

In step 5-50, the NR base station 5-02 may transmit a DLInformationTransfer message to the UE 5-01. The registration accept message may be contained in the message.

Figure 6:
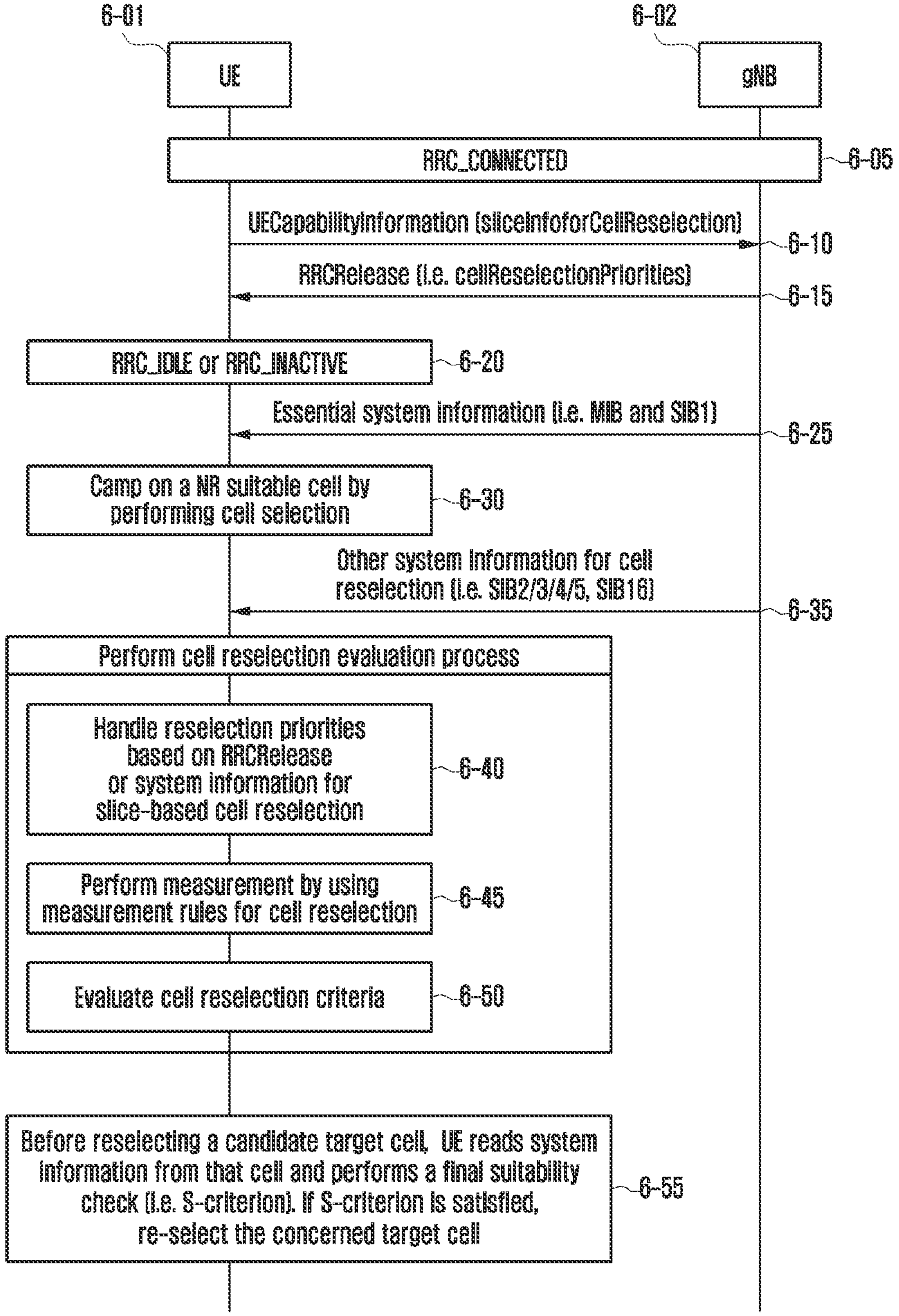
FIG. 6 illustrates a UE supporting slice-based cell reselection performs a slice-based cell reselection procedure in a next-generation mobile communication system according to an embodiment.

FIG. 6 illustrates a UE supporting slice-based cell reselection performs a slice-based cell reselection procedure in a next-generation mobile communication system according to an embodiment.

A UE according to the disclosure may support slice-based cell reselection in a camped normally state (when camped on a suitable cell). For example, the UE may perform a slice-based cell reselection procedure in consideration of one or a plurality of NSAGs provided from a non-access stratum (NAS) and a priority for each NSAG.

Referring to FIG. 6, a UE 6-01 may set up an RRC connection with an NR base station 6-02 and be in an RRC connected mode (RRC_CONNECTED) in step 6-05. The UE may configure NSAG information and priority information for each NSAG with an NAS message through an AMF through the above-described embodiment in FIG. 5.

In step 6-10, the UE 6-01 may transmit a UE capability information message (UECapabilityInformation) to the NR base station 6-02. The message may include the following indicator (sliceInfoforCellReselection).

Indicator indicating whether slice reselection information included in a system information block (hereinafter, SIB) and/or an RRC connection release (RRCRelease) message is supported to perform slice-based cell reselection in RRC idle mode (RRC_IDLE) and RRC inactive mode (RRC_INACTIVE), which indicate whether the UE supports slice reselection information in SIB and/or on the RRCRelease message for slice-based cell reselection in the RRC_IDLE and RRC_INACTIVE modes.

In step 6-15, the NR base station 6-02 may transmit the RRCRelease message to the UE 6-01. Cell reselection priority configuration information may be contained in the message. The cell reselection priority configuration information may include at least one of a frequency priority list for EUTRA (freqPriorityListEUTRA), a frequency priority list for NR (freqPriorityListNR), a t320 timer value, and a frequency priority list dedicated to slicing (freqPriorityList-DedicatedSlicing).

The FreqPriorityListEUTRA may include one or more FreqPriorityEUTRAs, and is a list that may include up to maxFreq (=8) FreqPriorityEUTRAs. Each FreqPriority-EUTRA may include at least one of a reference radio frequency channel number (ARFCN-ValueEUTRA) indicating a carrier frequency, a cell reselection priority value (CellReselectionPriority), and a cell reselection sub-priority value (cellReselectionSubPriority). The cell reselection priority value may be configured to an integer value of 0 to 7, and the cell reselection sub-priority value may be configured to a decimal value of one of 0.2, 0.4, 0.6, and 0.8. When the cell reselection priority value and the cell reselection sub-priority value are simultaneously configured for a specific carrier frequency, the UE may derive the cell reselection priority value by adding the two values. When only one of the cell reselection priority value and the cell reselection sub-priority value is configured for a specific carrier frequency, the UE may derive the cell reselection priority value with the configured value.

The FreqPriorityListNR may include one or more FreqPriorityNRs, and is a list that may include up to maxFreq (=8) FreqPriorityNRs (according to the UE capability). The FreqPriorityNR may include at least one of a reference radio frequency channel number (ARFCN-ValueNR) indicating a carrier frequency, a cell reselection priority value (CellReselectionPriority), and a cell reselection sub-priority value (cellReselectionSubPriority). As described above, the UE may derive a cell reselection priority value for each NR carrier frequency. Herein, for convenience of description, cell reselection priority information included in the list may be referred to as conventional cell reselection priority information.

The t320 timer value may be configured to one of 5 minutes, 10 minutes, 20 minutes, 30 minutes, 60 minutes, 120 minutes, and 180 minutes. Of course, the value may also be configured to other values. The UE may perform a cell reselection evaluation procedure by driving the T320 timer with the configured timer value and applying the cell reselection priority configuration information received in the RRC connection release message. For example, until the T320 timer expires or stops, the UE may perform the cell reselection evaluation procedure by applying the cell reselection priority configuration information received in the RRC connection release message. If the timer value is not configured, the UE may perform the cell reselection evaluation procedure by applying the cell reselection priority configuration information, until the cell reselection priority configuration information received in the RRC connection release message is deleted. When performing a cell reselection evaluation procedure by applying the cell reselection priority configuration information received in the RRC connection release message, the UE may disregard the cell reselection priority configuration information broadcast in system information. The T320 timer and the above description may be commonly applied to conventional cell reselection priority information and slice cell reselection priority information.

The FreqPriorityListDedicatedSlicing may include one or more FreqPriorityDedicatedSlicings, and is a list that may include up to maxFreq (=8) FreqPriorityDedicatedSlicings (according to the UE capability). The FreqPriorityDedicatedSlicing may include at least one of a reference radio frequency channel number (ARFCN-ValueNR) indicating a carrier frequency and a slice-only information list (SliceInfoListDedicated). The SliceInfoListDedicated may include at least one of NSAG identity information (NSAG-IdentityInfo), an NSAG cell reselection priority value (nsag-CellReselectionPriority), and an NSAG cell reselection sub-priority value (nsag-CellReselectionSubPriority). The NSAG cell reselection priority value may be configured to an integer value within the same range as the cell reselection priority value described above, and the NSAG cell reselection sub-priority value may be configured to a decimal value within the same range as the cell reselection sub-priority value described above. The NSAG-IdentityInfo may include at least one of an NSAG identifier (NSAG-ID) and a TA code (trackingAreaCode). For the NR carrier frequency included in each FreqPriorityDedicatedSlicing, a cell reselection priority value may be derived according to the above-described method. Herein, for convenience of description, cell reselection priority information included in the list may be referred to as slice cell reselection priority information.

In step 6-15, the NR base station 6-02 may transmit an RRC connection release message to the UE 6-01 without simultaneously including conventional cell reselection priority information and slice cell reselection priority information for the same NR frequency.

In step 6-20, upon receiving the RRCRelease message, the UE 6-01 may transition to an RRC idle mode or an RRC inactive mode. Specifically, when receiving the RRCRelease message including the suspended configuration information (suspendConfig), the UE 6-01 may transition to the RRC inactive mode, and otherwise, the UE 6-01 may transition to the RRC idle mode.

In step 6-25, the UE 6-01 in the RRC idle mode or the RRC inactive mode may obtain system information. The system information may refer to a master information block (MIB) and a system information block 1 (SIB1).

In step 6-30, the UE 6-01 in the RRC idle mode or the RRC inactive mode may camp-on to an NR suitable cell by performing a cell selection procedure. The cell camped on by the UE 6-01 may be referred to as a serving cell.

Herein, based on the standard, a suitable cell may be defined when the conditions in Table 2 below are satisfied.

TABLE 2

| suitable cell: |
| --- |
| For UE not operating in SNPN Access Mode, a cell is considered as suitable if the following conditions are fulfilled:<br>The cell is part of either the selected PLMN or the registered PLMN or PLMN of the Equivalent PLMN list, and for that PLMN either:<br>The PLMN-ID of that PLMN is broadcast by the cell with no associated CAG-IDs and CAG-only indication in the UE for that PLMN (TS 23.501) is absent or false;<br>Allowed CAG list in the UE for that PLMN (TS 23.501) includes a CAG-ID broadcast by the cell for that PLMN;<br>The cell selection criteria are fulfilled, see clause 5.2.3.2.<br>According to the latest information provided by NAS:<br>The cell is not barred, see clause 5.3.1;<br>The cell is part of at least one TA that is not part of the list of "Forbidden Tracking Areas for Roaming" (TS 22.011), which belongs to a PLMN that fulfils the first bullet above.<br>For UE operating in SNPN Access Mode, a cell is considered as suitable if the following conditions are fulfilled:<br>The cell is part of either the selected SNPN or the registered SNPN of the UE;<br>The cell selection criteria are fulfilled, see clause 5.2.3.2;<br>According to the latest information provided by NAS:<br>The cell is not barred, see clause 5.3.1;<br>The cell is part of at least one TA that is not part of the list of "Forbidden Tracking Areas for Roaming" which belongs to either the selected SNPN or the registered SNPN of the UE. |

The UE may determine that a cell selection criterion (S-criterion) is satisfied when the following expression is satisfied.

$$Srxlev>0 \text{ AND } Squal>0$$

where $$Srxlev=Q_{rxlevmeas}-(Q_{rxlevmin}+Q_{rxlevminoffset})-P_{compensation}-Qoffset_{temp},$$

$$Squal=Q_{qualmeas}-(Q_{qualmin}+Q_{qualminoffset})-Qoffset_{temp}.$$

Definitions of these parameters are provided in the standard.

In step 6-35, the UE 6-01 in the RRC idle mode or the RRC inactive mode may obtain system information (e.g., SIB2, SIB3, SIB4, SIB5, and SIB16) including cell reselection information from the serving cell 6-02 in order to perform the cell reselection evaluation procedure. The SIB2 may include information/parameters commonly applied to reselection of NR intra-frequency, NR inter-frequency, and inter-RAT frequency cells by the UE 6-01, and NR intra-frequency cell reselection information excluding information related to NR intra-frequency neighboring cells. As an example, the SIB2 may include one piece of cell reselection priority configuration information for a serving NR frequency (a frequency to which one cell currently camps-on). The cell reselection priority configuration information may refer to cellReselectionPriority and cellReselectionSubPriority. Specifically, the cellReselectionPriority may contain an integer value (e.g., one integer value from 0 to 7), and the cellReselectionSubPriority may contain a decimal value (e.g., one of 0.2, 0.4, 0.6, and 0.8). If both cellReselectionPriority and cellReselectionSubPriority are signaled, the UE may derive the cell reselection priority value by adding the two values. A larger cell reselection priority value refers to a higher priority. Specifically, cell reselection configuration information broadcast in SIB2 may be as illustrated in Table 3 below.

TABLE 3

```
SIB2 ::=                                SEQUENCE {
   cellReselectionInfoCommon                 SEQUENCE {
      nrofSS-BlocksToAverage                         INTEGER (2..maxNrofSS-
BlocksToAverage)           OPTIONAL,                 -- Need S
      absThreshSS-BlocksConsolidation                             ThreshholdNR
OPTIONAL,              -- Need S
      rangeToBestCell                                           RangeToBestCell
OPTIONAL,              -- Need R
      q-Hyst                                         ENUMERATED {
                                                             dB0, dB1, dB2, dB3,
dB4, dB5, dB6, dB8, dB10,
                                                             dB12, dB14, dB16,
dB18, dB20, dB22, dB24},
      speedStateReselectionPars                  SEQUENCE {
         mobilityStateParameters                     MobilityStateParameters,
         q-HystSF                                    SEQUENCE {
            sf-Medium                                           ENUMERATED
{dB-6, dB-4, dB-2, dB0},
            sf-High                                         ENUMERATED {dB-
6, dB-4, dB-2, dB0}
         }
      }
```

TABLE 3-continued

```
OPTIONAL,                -- Need R
  ...
  },
  cellReselectionServingFreqInfo          SEQUENCE {
    s-NonIntraSearchP                                ReselectionThreshold
OPTIONAL,                -- Need S
    s-NonIntraSearchQ                                ReselectionThresholdQ
OPTIONAL,                -- Need S
    threshServingLowP                            ReselectionThreshold,
    threshServingLowQ                                ReselectionThresholdQ
OPTIONAL,                -- Need R
    cellReselectionPriority                 CellReselectionPriority,
    cellReselectionSubPriority                   CellReselectionSubPriority
OPTIONAL,                -- Need R
    ...
  },
  intraFreqCellReselectionInfo            SEQUENCE {
    q-RxLevMin                                 Q-RxLevMin,
    q-RxLevMinSUL                                       Q-RxLevMin
OPTIONAL,                -- Need R
    q-QualMin                                             Q-QualMin
OPTIONAL,                -- Need S
    s-IntraSearchP                          ReselectionThreshold,
    s-IntraSearchQ                               ReselectionThresholdQ
OPTIONAL,                -- Need S
    t-ReselectionNR                         T-Reselection,
    frequencyBandList
MultiFrequencyBandListNR-SIB                     OPTIONAL,          -
- Need S
    frequencyBandListSUL
MultiFrequencyBandListNR-SIB                     OPTIONAL,          -
- Need R
    p-Max                                                 P-Max
OPTIONAL,                -- Need S
    smtc                                                  SSB-MTC
OPTIONAL,                -- Need S
    ss-RSSI-Measurement                          SS-RSSI-Measurement
OPTIONAL,                -- Need R
    ssb-ToMeasure                                      SSB-ToMeasure
OPTIONAL,                -- Need S
    deriveSSB-IndexFromCell                 BOOLEAN,
    ...,
    [[
    t-ReselectionNR-SF                           SpeedStateScaleFactors
OPTIONAL,                -- Need N
    ]],
    [[
    smtc2-LP-r16                                   SSB-MTC2-LP-r16
OPTIONAL,                -- Need R
    ssb-PositionQCL-Common-r16                     SSB-PositionQCL-
Relation-r16                      OPTIONAL             -- Cond
SharedSpectrum
    ]]
  },
  ...,
  [[
  relaxedMeasurement-r16                      SEQUENCE {
    lowMobilityEvaluation-r16                     SEQUENCE {
      s-SearchDeltaP-r16                             ENUMERATED {
                                                            dB3, dB6, dB9,
dB12, dB15,
                                                            spare3, spare2,
spare1},
      t-SearchDeltaP-r16                             ENUMERATED {
                                                            s5, s10, s20,
s30, s60, s120, s180,
                                                            s240, s300,
spare7, spare6, spare5,
                                                            spare4, spare3,
spare2, spare1}
    }
OPTIONAL,                -- Need R
    cellEdgeEvaluation-r16                        SEQUENCE {
      s-SearchThresholdP-r16                         ReselectionThreshold,
      s-SearchThresholdQ-r16                         ReselectionThresholdQ
OPTIONAL                 -- Need R
    }
OPTIONAL,                -- Need R
    combineRelaxedMeasCondition-r16              ENUMERATED {true}
OPTIONAL,                -- Need R
```

TABLE 3-continued

```
    highPriorityMeasRelax-r16                          ENUMERATED {true}
OPTIONAL              -- Need R
   }
OPTIONAL              -- Need R
   ]]
}
RangeToBestCell       ::= Q-OffsetRange
```

The SIB3 may include neighboring cell information/parameters for the UE to reselect an NR intra-frequency cell. As an example, in the SIB3, an NR intra-frequency cell list (intraFreqNeighCellList) for reselecting NR intra-frequency cells or a cell list (intraFreqBlackCellList) in which NR intra-frequency cell reselection is not allowed may be broadcast. Specifically, information shown below in Table 4 may be broadcast in the SIB3.

TABLE 4

```
SIB3 ::=                                       SEQUENCE {
intraFreqNeighCellList                         IntraFreqNeighCellList
OPTIONAL,      -- Need R
intraFreqBlackCellList                         IntraFreqBlackCellList
OPTIONAL,      -- Need R
lateNonCriticalExtension                       OCTET STRING
OPTIONAL,
...,
[[
intraFreqNeighCellList-v1610                   IntraFreqNeighCellList-v1610
OPTIONAL,      -- Need R
intraFreqWhiteCellList-r16                     IntraFreqWhiteCellList-r16
OPTIONAL,      -- Cond SharedSpectrum2
intraFreqCAG-CellList-r16                      SEQUENCE (SIZE (1..maxPLMN))
OF IntraFreqCAG-CellListPerPLMN-r16                 OPTIONAL      -- Need R
]]
}
IntraFreqNeighCellList ::=                     SEQUENCE (SIZE (1..maxCellIntra))
OF IntraFreqNeighCellInfo
IntraFreqNeighCellList-v1610::=                SEQUENCE (SIZE (1..maxCellIntra))
OF IntraFreqNeighCellInfo-v1610
IntraFreqNeighCellInfo ::=                     SEQUENCE {
physCellId                                         PhysCellId,
q-OffsetCell                                       Q-OffsetRange,
q-RxLevMinOffsetCell                               INTEGER (1..8)
OPTIONAL,      -- Need R
q-RxLevMinOffsetCellSUL                            INTEGER (1..8)
OPTIONAL,      -- Need R
q-QualMinOffsetCell                                INTEGER (1..8)
OPTIONAL,      -- Need R
...
}
IntraFreqNeighCellInfo-v1610 ::=               SEQUENCE {
ssb-PositionQCL-r16                                SSB-PositionQCL-Relation-r16
OPTIONAL       -- Cond SharedSpectrum2
}
IntraFreqBlackCellList ::=                     SEQUENCE (SIZE (1..maxCellBlack))
OF PCI-Range
IntraFreqWhiteCellList-r16 ::=                 SEQUENCE (SIZE (1..maxCellWhite))
OF PCI-Range
IntraFreqCAG-CellListPerPLMN-r16 ::= SEQUENCE {
plmn-IdentityIndex-r16                             INTEGER (1..maxPLMN),
cag-CellList-r16                                   SEQUENCE (SIZE (1..maxCAG-
Cell-r16)) OF PCI-Range
}
```

The SIB4 may include information/parameters for the UE to reselect an NR inter-frequency cell. As an example, one or a plurality of NR inter-frequencies may be broadcast in SIB4, and one cell reselection priority configuration information for each NR inter-frequency may be broadcast. The cell reselection priority configuration information for each NR inter-frequency refers to the above description (e.g., cellReselectionPriority and/or cellReselectionSubPriority mapped to each NR inter-frequency), but there is a feature in that one cell reselection priority configuration information for each inter-frequency is optionally broadcast. Specifically, information shown below in Table 5 may be broadcast in the SIB4.

TABLE 5

```
SIB4 ::=                              SEQUENCE {
   interFreqCarrierFreqList             InterFreqCarrierFreqList,
   lateNonCriticalExtension                             OCTET STRING
OPTIONAL,
   ...,
   [[
   interFreqCarrierFreqList-v1610            InterFreqCarrierFreqList-v1610
OPTIONAL       -- Need R
   ]]
}
InterFreqCarrierFreqList ::=          SEQUENCE (SIZE (1..maxFreq)) OF
InterFreqCarrierFreqInfo
InterFreqCarrierFreqList-v1610 ::=    SEQUENCE (SIZE (1..maxFreq)) OF
InterFreqCarrierFreqInfo-v1610
InterFreqCarrierFreqInfo ::=        SEQUENCE {
   dl-CarrierFreq                         ARFCN-ValueNR,
   frequencyBandList                        MultiFrequencyBandListNR-SIB
OPTIONAL,     -- Cond Mandatory
   frequencyBandListSUL                       MultiFrequencyBandListNR-
SIB                                   OPTIONAL,    -- Need R
   nrofSS-BlocksToAverage                       INTEGER (2..maxNrofSS-
BlocksToAverage)                      OPTIONAL,    -- Need S
   absThreshSS-BlocksConsolidation                            ThresholdNR
OPTIONAL,     -- Need S
   smtc                                                         SSB-MTC
OPTIONAL,     -- Need S
   ssbSubcarrierSpacing                   SubcarrierSpacing,
   ssb-ToMeasure                                             SSB-ToMeasure
OPTIONAL,     -- Need S
   deriveSSB-IndexFromCell                  BOOLEAN,
   ss-RSSI-Measurement                              SS-RSSI-Measurement
OPTIONAL,
   q-RxLevMin                                 Q-RxLevMin,
   q-RxLevMinSUL                                                Q-RxLevMin
OPTIONAL,     -- Need R
   q-QualMin                                                       Q-QualMin
OPTIONAL,     -- Need S
   p-Max                                                              P-Max
OPTIONAL,     -- Need S
   t-ReselectionNR                          T-Reselection,
   t-ReselectionNR-SF                               SpeedStateScaleFactors
OPTIONAL,     -- Need S
   threshX-HighP                            ReselectionThreshold,
   threshX-LowP                             ReselectionThreshold,
   threshX-Q                                SEQUENCE {
      threshX-HighQ                             ReselectionThresholdQ,
      threshX-LowQ                                ReselectionThresholdQ
   }
OPTIONAL,     -- Cond RSRQ
   cellReselectionPriority                          CellReselectionPriority
OPTIONAL,     -- Need R
   cellReselectionSubPriority                   CellReselectionSubPriority
OPTIONAL,     -- Need R
   q-OffsetFreq                                               Q-OffsetRange
DEFAULT dB0,
   interFreqNeighCellList                           InterFreqNeighCellList
OPTIONAL,     -- Need R
   interFreqBlackCellList                           InterFreqBlackCellList
OPTIONAL,     -- Need R
   ...
}
InterFreqCarrierFreqInfo-v1610 ::= SEQUENCE {
   interFreqNeighCellList-v1610               InterFreqNeighCellList-v1610
OPTIONAL,     -- Need R
   smtc2-LP-r16                                          SSB-MTC2-LP-r16
OPTIONAL,     -- Need R
   interFreqWhiteCellList-r16                 InterFreqWhiteCellList-r16
OPTIONAL,     -- Cond SharedSpectrum2
   ssb-PositionQCL-Common-r16               SSB-PositionQCL-Relation-r16
OPTIONAL,     -- Cond SharedSpectrum
   interFreqCAG-CellList-r16                          SEQUENCE (SIZE
(1..maxPLMN)) OF InterFreqCAG-CellListPerPLMN-r16          OPTIONAL
-- Need R
}
InterFreqNeighCellList ::=          SEQUENCE (SIZE (1..maxCellInter)) OF
InterFreqNeighCellInfo
InterFreqNeighCellList-v1610 ::=    SEQUENCE (SIZE (1..maxCellInter)) OF
InterFreqNeighCellInfo-v1610
InterFreqNeighCellInfo ::=            SEQUENCE {
   physCellId                               PhysCellId,
```

TABLE 5-continued

```
  q-OffsetCell                              Q-OffsetRange,
  q-RxLevMinOffsetCell                              INTEGER (1..8)
OPTIONAL,      -- Need R
  q-RxLevMinOffsetCellSUL                           INTEGER (1..8)
OPTIONAL,      -- Need R
  q-QualMinOffsetCell                               INTEGER (1..8)
OPTIONAL,      -- Need R
  ...
}
InterFreqNeighCellInfo-v1610 ::=      SEQUENCE {
  ssb-PositionQCL-r16                       SSB-PositionQCL-Relation-r16
OPTIONAL       -- Cond SharedSpectrum2
}
InterFreqBlackCellList ::=            SEQUENCE (SIZE (1..maxCellBlack))
OF PCI-Range
InterFreqWhiteCellList-r16 ::=        SEQUENCE (SIZE (1..maxCellWhite))
OF PCI-Range
InterFreqCAG-CellListPerPLMN-r16 ::= SEQUENCE {
  plmn-IdentityIndex-r16                INTEGER (1..maxPLMN),
  cag-CellList-r16                      SEQUENCE (SIZE (1..maxCAG-
Cell-r16)) OF PCI-Range
}
```

The SIB5 may include information/parameters for the UE to reselect an inter-RAT frequency cell. As an example, one or a plurality of EUTRA frequencies may be broadcast in SIB5, and one cell reselection priority configuration information for each EUTRA frequency may be broadcast. The cell reselection priority configuration information for each EUTRA frequency refers to the above description (e.g., cellReselectionPriority and/or cellReselectionSubPriority mapped to each EUTRA frequency), but there is a feature in that one cell reselection priority configuration information for each EUTRA frequency is optionally broadcast. Specifically, information illustrated below in Table 6 may be broadcast in the SIB5.

TABLE 6

```
SIB5 ::=                          SEQUENCE {
  carrierFreqListEUTRA                      CarrierFreqListEUTRA
OPTIONAL,                    -- Need R
  t-ReselectionEUTRA                  T-Reselection,
  t-ReselectionEUTRA-SF                     SpeedStateScaleFactors
OPTIONAL,                    -- Need S
  lateNonCriticalExtension                  OCTET STRING
OPTIONAL,
  ...,
  [[
  carrierFreqListEUTRA-v1610            CarrierFreqListEUTRA-v1610
OPTIONAL                     -- Need R
  ]]
}
CarrierFreqListEUTRA ::=          SEQUENCE (SIZE (1..maxEUTRA-
Carrier)) OF CarrierFreqEUTRA
CarrierFreqListEUTRA-v1610 ::=    SEQUENCE (SIZE (1..maxEUTRA-
Carrier)) OF CarrierFreqEUTRA-v1610
CarrierFreqEUTRA ::=              SEQUENCE {
  carrierFreq                       ARFCN-ValueEUTRA,
  eutra-multiBandInfoList                 EUTRA-MultiBandInfoList
OPTIONAL,                    -- Need R
  eutra-FreqNeighCellList                 EUTRA-FreqNeighCellList
OPTIONAL,                    -- Need R
  eutra-BlackCellList                     EUTRA-FreqBlackCellList
OPTIONAL,                    -- Need R
  allowedMeasBandwidth                            EUTRA-
AllowedMeasBandwidth,
  presenceAntennaPort1              EUTRA-PresenceAntennaPort1,
  cellReselectionPriority                   CellReselectionPriority
OPTIONAL,                    -- Need R
  cellReselectionSubPriority              CellReselectionSubPriority
OPTIONAL,                    -- Need R
  threshX-High                        ReselectionThreshold,
  threshX-Low                           ReselectionThreshold,
  q-RxLevMin                              INTEGER (-70..-22),
  q-QualMin                             INTEGER (-34..-3),
  p-MaxEUTRA                                INTEGER (-30..33),
  threshX-Q                           SEQUENCE {
    threshX-HighQ                         ReselectionThresholdQ,
    threshX-LowQ                            ReselectionThresholdQ
  }
OPTIONAL                     -- Cond RSRQ
```

TABLE 6-continued

```
}
CarrierFreqEUTRA-v1610 ::= SEQUENCE {
   highSpeedEUTRACarrier-r16                    ENUMERATED {true}
OPTIONAL                    -- Need R
}
EUTRA-FreqBlackCellList ::=           SEQUENCE (SIZE (1..maxEUTRA-
CellBlack)) OF EUTRA-PhysCellIdRange
EUTRA-FreqNeighCellList ::=                          SEQUENCE (SIZE
(1..maxCellEUTRA)) OF EUTRA-FreqNeighCellInfo
EUTRA-FreqNeighCellInfo ::=           SEQUENCE {
   physCellId                            EUTRA-PhysCellId,
   dummy                                    EUTRA-Q-OffsetRange,
   q-RxLevMinOffsetCell                                INTEGER (1..8)
OPTIONAL,                   -- Need R
   q-QualMinOffsetCell                                 INTEGER (1..8)
OPTIONAL                    -- Need R
}
```

The SIB16 may include information/parameters for the UE to reselect a slice-based cell. As an example, in the SIB16, slice-based cell reselection priority information for NR frequencies at which the UE may perform slice-based cell reselection among NR frequencies broadcast in the SIB2 and SIB4 may be broadcast. Specifically, a slice information list (SliceInfoList) for each NR frequency capable of performing the slice-based cell reselection may be broadcast. The SliceInfoList is composed of one or a plurality of SliceInfo, and each SliceInfo may include at least one of nsag-IdentityInfo, nsag-CellReselectionPriority, nsag-CellReselectionSubPriority, and sliceCellList. Specifically, information illustrated below in Table 7 may be broadcast in the SIB16.

TABLE 7

```
SIB16-r17 ::=                              SEQUENCE {
   freqPriorityListSlicing-r17                        FreqPriorityListSlicing-r17
OPTIONAL, -- Need R
   lateNonCriticalExtension                            OCTET STRING
OPTIONAL,
   ...
}
FreqPriorityListSlicing-r17 ::= SEQUENCE (SIZE (1..maxFreqPlus1)) OF
FreqPrioritySlicing-r17
FreqPrioritySlicing-r17 ::=            SEQUENCE {
      dl-ImplicitCarrierFreq-r17                INTEGER (0..maxFreq),
   sliceInfoList-r17                                       SliceInfoList-r17
OPTIONAL -- Need R
}
SliceInfoList-r17 ::=                    SEQUENCE (SIZE (1..maxSliceInfo-r17))
OF SliceInfo-r17
SliceInfo-r17 ::=                        SEQUENCE {
   nsag-IdentityInfo-r17                          NSAG-IdentityInfo-r17,
   nsag-CellReselectionPriority-r17                    CellReselectionPriority
OPTIONAL, -- Need R
   nsag-CellReselectionSubPriority-r17                 CellReselectionSubPriority
OPTIONAL, -- Need R
   sliceCellListNR-r17                         CHOICE {
         sliceAllowedCellListNR-r17                  SliceCellListNR-r17,
         sliceExcludedCellListNR-r17              SliceCellListNR-r17
   }
OPTIONAL -- Need R
}
SliceCellListNR-r17 ::=                  SEQUENCE (SIZE (1..maxCellSlice-r17))
OF PCI-Range
```

| FreqPriorityListSlicing field descriptions |
|---|
| dl-ImplicitCarrierFreq<br>Indicates the downlink carrier frequency to which sliceInfoList is associated with. The frequency is signalled implicitly, value 0 corresponds to the serving frequency, value 1 corresponds to the first frequency indicated by the InterFreqCarrierFreqList in SIB4, and value 2 corresponds to the second frequency indicated by the InterFreqCarrierFreqList in SIB4, and so on. |

| SliceInfo field descriptions |
|---|
| nsag-IdentityInfo<br>This is the NSAG identifier of the NSAG |
| sliceAllowedCellListNR<br>List of allow-listed neighbouring cells for slicing. If present, cells not listed in this list do not support the corresponding nsag-frequency pair, according to 38.304, clause 5.2.4.11. |

TABLE 7-continued

| |
|---|
| sliceCellListNR<br>Contains either the list of allow-listed or exclude-listed neighbour cells for slicing.<br>sliceExcludedCellListNR<br>List of exclude-listed neighbouring cells for slicing. If present, cells not listed in this list support the corresponding nsag-frequency pair, according to 38.304, clause 5.2.4.11. |

Herein, cell reselection priority information broadcast in the SIB2, SIB4, and SIB5 may be referred to as conventional cell reselection priority information, and cell reselection priority information broadcast in the SIB 16 may be referred to as slice cell reselection priority configuration information (cellReselectionPriorities).

In step 6-40, the UE 6-01 in the RRC idle mode or the RRC inactive mode may derive a reselection priority for slice-based cell reselection. When the cellReselectionPriorities are configured in the RRC connection release message, reselection priorities may be derived by applying the cellReselectionPriorities as described above. For example, the UE 6-01 may disregard the reselection priority broadcast in the system information. However, when the cellReselectionPriorities of the RRC connection release message are not applied as described above, the UE 6-01 may derive the reselection priority by applying the reselection priority information broadcast in the system information. Specifically, the UE 6-01 may derive reselection priorities according to the following predetermined rules.

Frequencies that support at least one prioritized NSAG received from NAS have higher re-selection priority than frequencies that support none of the NSAG(s) received from NAS.

Frequencies that support at least one NSAG provided by NAS are prioritized in the order of the NAS-provided priority for the NSAG with highest priority supported on the frequency. As an example, when NSAG 1 and NSAG 2 are supported at a specific frequency, but the NSAG 1 priority value (provided by the NAS) is 3 and the NSAG 2 priority value is 1, the corresponding frequency may be prioritized according to the priority value of the NSAG 1.

Among the frequencies (one or multiple) that support the highest prioritized NSAG(s) with the same NAS-provided priorities, the frequencies are prioritized in the order of their highest nsag-CellReselectionPriority given for these NSAG(s). As an example, when frequency 1 supports NSAG 1 (NSAG 1 priority value is 2), frequency 2 supports NSAG 2 (NSAG 2 priority value is 2), nsag-CellReselectionPriority for the NSAG 1 in the frequency 1 is broadcast as 3, and nsag-CellReselectionPriority for the NSAG 2 in the frequency 2 is broadcast as 2, the frequency 1 may be prioritized over the frequency 2.

Frequencies that support an NSAG provided by NAS and that indicate nsag-CellReselectionPriority for the NSAG have higher re-selection priority than frequencies that support this prioritized NSAG without indicating nsag-CellReselectionPriority for the NSAG. Alternatively, frequencies that support an NSAG provided by NAS and that indicate nsag-CellReselectionPriority (greater than 0) and/or nsag-CellReselectionSubPriority (greater than 0) have higher re-selection priority than frequencies support this prioritized NSAG without indicating nsag-CellReselectionPriority and/or nsag-CellReselectionSubPriority for the NSAG.

Frequencies that support none of the NSAG(s) provided by NAS are prioritized in the order of their cellReselectionPriority and/or cellReselectionSubPriority.

The UE considers an NR frequency to support all slices of an NSAG if the corresponding nsag-ID is indicated for the NR frequency and valid for current TA.

In step 6-45, the UE 6-01 in the RRC idle mode or the RRC inactive mode may perform frequency measurement for cell reselection by using the following measurement rule according to the cell reselection priority determined in step 6-40 in order to minimize battery consumption.

When the reception level (Srxlev) of the serving cell is greater than the SIntraSearchP threshold and the reception quality (Squal) of the serving cell is greater than the SIntraSearchQ threshold (Serving cell fulfills Srxlev>SIntraSearchP and Squal>SIntraSearchQ), the UE may not perform an NR intra-frequency measurement. Otherwise, the UE performs the NR intra-frequency measurement.

For an NR inter-frequency or inter-RAT frequency having a higher reselection priority than the NR frequency of the current serving cell, the UE may perform measurement according to the standard.

For an NR inter-frequency having a reselection priority lower than or equal to the NR frequency of the current serving cell and an inter-RAT frequency having a reselection priority lower than the NR frequency of the current serving cell, the UE may not perform measurement if the reception level (Srxlev) of the serving cell is greater than the SnonIntraSearchP threshold and the reception quality (Squal) of the serving cell is greater than the SnonIntraSearchQ threshold (Serving cell fulfills Srxlev>SnonIntraSearchP and Squal>SnonIntraSearchQ). Otherwise, the UE measures cells in an NR inter-frequency having a reselection priority lower than or equal to the NR frequency, or measures cells in an inter-RAT frequency having a reselection priority lower than the NR frequency.

The aforementioned threshold values (SintraSearchP, SintraSearchQ, SnonIntraSearchP, and SnonintraSearchQ) may be broadcast in the system information obtained in step 8-20.

In step 6-50, the UE 6-01 in the RRC idle mode or RRC inactive state may determine to reselect a cell that satisfies cell reselection criteria based on the measurement value performed in step 6-45. Different criteria may be applied as the cell reselection criteria according to the cell reselection priority. Cell reselection to a higher priority RAT/frequency may take precedence over a lower priority RAT/frequency if multiple cells of different priorities fulfil the cell reselection criteria. Specifically, the operation of the UE for the reselection criteria of the inter-frequency/inter-RAT cell having higher priority than the frequency of the current serving cell is as follows.

In a first operation, when the SIB2 includes a threshold for threshServingLowQ and is broadcast, and 1 second has passed since the UE camped on the current serving cell, if the signal quality (Squal) of the inter-frequency/inter-RAT cell is greater than the threshold $Thresh_{X,\ HighQ}$ during a specific time interval TreselectionRAT (Squal>

$Thresh_{X, HighQ}$ during a time interval TreselectionRAT), the UE performs reselection to the corresponding inter-frequency/inter-RAT cell.

In a second operation, when the UE fails to perform the first operation, the UE performs the second operation. When 1 second has elapsed since the UE camped on the current serving cell and the reception level (Srxlev) of the inter-frequency/inter-RAT cell is greater than the threshold $Thresh_{X, HighP}$ for a specific time interval TreselectionRAT (Srxlev>$Thresh_{X, HighP}$ during a time interval Treselection-RAT-), the UE performs reselection to the corresponding inter-frequency/inter-RAT cell.

The UE performs the first operation or the second operation, based on information including signal quality (Squal), reception level (Srxlev), thresholds ($Thresh_{X, HighQ}$, $Thresh_{X, HighP}$), and TreselectionRAT values of the inter-frequency cell in the SIB4 broadcast in the serving cell, and performs the first operation or the second operation, based on information including signal quality (Squal), reception level (Srxlev), thresholds ($Thresh_{X, HighQ}$, $Thresh_{X, HighP}$), and TreselectionRAT values of the inter-RAT cell in the SIB5 broadcast in the serving cell. As an example, the SIB4 includes a $Q_{qualmin}$ value or a $Q_{rxlevmin}$ value, and based on this, derives the signal quality (Squal) or reception level (Srxlev) of the inter-frequency cell. If there are a plurality of cells in the NR frequency that satisfy the high cell reselection priority, the UE may reselect the highest ranked cell among cells that satisfy the reselection criteria of an intra-frequency/inter-frequency cell having the same priority as the frequency of the current serving cell described in detail below.

In addition, for the reselection criteria of the intra-frequency/inter-frequency cell having the same priority as the frequency of the current serving cell, the UE performs a third operation. Specifically, when the intra-frequency/inter-frequency cell's signal quality (Squal) and reception level (Srxlev) are greater than 0, the rank for each cell is derived based on the measurement value (RSRP) (The UE may perform ranking of all cells that fulfills the cell selection criterion S). Ranks of the serving cell and the neighboring cell are calculated through Equation (1) and Equation (2), respectively, as follows.

$$Rs=Q\text{meas},s+Q\text{hyst} \quad (1)$$

$$Rn=Q\text{meas},n-Q\text{offset} \quad (2)$$

In Equations (1) and (2), Qmeas,s is the RSRP measurement value of the serving cell, Qmeas,n is the RSRP measurement value of the neighboring cell, Qhyst is the hysteresis value of the serving cell, and Qoffset is the offset between the serving cell and the neighboring cell. The SIB2 includes a Qhyst value, and the value is commonly used for intra-frequency/inter-frequency cell reselection. When intra-frequency cell reselection, Qoffset is signaled for each cell, applied only to the indicated cell, and included in the SIB3. When inter-frequency cell reselection, Qoffset is signaled for each cell, applied only to the indicated cell, and included in the SIB4. When the rank of the neighboring cell obtained from Equation 2 is greater than the rank of the serving cell (R-n>Rs), the optimal cell among the neighboring cells is reselected.

In addition, for the reselection criteria of the inter-frequency/inter-RAT cell having a lower priority than the frequency of the current serving cell, the UE performs a fourth operation. Specifically, when a threshold for threshServingLowQ is included and broadcast in the SIB2, and 1 second has passed since the UE camped on the current serving cell, if the signal quality (Sqaul) of the current serving cell is less than the threshold $Thresh_{Serving, LowQ}$ (Squal<$Thresh_{Serving, LowQ}$), and the signal quality (Squal) of the inter-frequency/inter-RAT cell is greater than the threshold $Thresh_{X, LowQ}$—during a specific time interval TreselectionRAT (Squal>$Thresh_{X, LowQ}$ during a time interval TreselectionRAT), the UE performs reselection to the corresponding inter-frequency/inter-RAT cell.

In a fifth operation, when the UE fails to perform the fourth operation, the fifth operation is performed.

When 1 second has elapsed since the UE camped on the current serving cell, the reception level (Srxlev) of the current serving cell is less than the threshold $Thresh_{Serving, LowP}$ (Srxlev<$Thresh_{Serving, LowP}$), and the reception level (Srxlev) of the inter-frequency/inter-RAT cell is greater than the threshold $Thresh_{X, LowQ}$—during a specific time interval TreselectionRAT (Srxlev>$Thresh_{X, LowP}$ during a time interval TreselectionRAT), the UE performs reselection to the corresponding inter-frequency/inter-RAT cell.

The fourth operation or the fifth operation for the inter-frequency cell of the UE is performed based on thresholds included in the SIB2 broadcast in the serving cell ($Thresh_{Serving, LowQ}$, $Thresh_{Serving, LowP}$), and signal quality (Squal), reception level (Srxlev), thresholds ($Thresh_{X, LowQ}$, $Thresh_{X, LowP}$), TreselectionRAT of the inter-frequency cell included in the SIB4 broadcast in the serving cell, and the fourth operation or the fifth operation for the inter-RAT cell of the UE is performed, based on thresholds included in the SIB2 broadcast in the serving cell ($Thresh_{Serving, LowQ}$, $Thresh_{Serving, LowP}$), and signal quality (Squal), reception level (Srxlev), thresholds ($Thresh_{X, LowQ}$, $Thresh_{X, LowP}$), TreselectionRAT of the inter-frequency cell included in the SIB5 broadcast in the serving cell. As an example, the SIB4 includes a $Q_{qualmin}$ value or a $Q_{rxlevmin}$ value, and based on this, derives the signal quality (Squal) or reception level (Srxlev) of the inter-frequency cell. If there are a plurality of cells in the NR frequency that satisfy the high cell reselection priority, the UE may reselect the highest ranked cell among cells that satisfy the reselection criteria of an intra-frequency/inter-frequency cell having the same priority as the frequency of the current serving cell described in detail below. Of course, when one candidate cell is derived by satisfying the above-described condition at a frequency having a higher priority or a lower priority than the frequency of the current serving cell, the UE may reselect a cell having the strongest signal strength in a corresponding frequency.

For a UE performing slice-based cell reselection according to an embodiment of the disclosure may additionally determine whether a specific cell (e.g., best cell or highest ranked cell) that satisfies the cell reselection criteria described above in step 6-50 supports the corresponding NSAG at a specific frequency, based on the NSAG derived according to step 6-40 and the reselection priority for the frequency. Specifically, the UE considers a cell on an NR frequency to support all slices of an NSAG if the corresponding nsag-ID is indicated for the NR frequency and valid for current TA, and the cell is either listed in the sliceAllowedCellListNR (if provided in the used slice specific cell reselection information) or the cell is not listed in the sliceExcludedCellListNR (if provided in the used slice specific cell reselection information), or neither sliceAllowedCellListNR nor sliceExcludedCellListNR is configured in the used slice specific cell reselection information.

If the best or highest ranked cell in a frequency fulfils the cell reselection criteria in 6-50 for cell reselection based on re-selection priority for the frequency and NSAG derived according to 6-40 but this cell does not support the NSAG as described above, the UE may re-derive a re-selection priority for the frequency by considering the NSAG(s) supported by this cell (rather than those of the corresponding NR frequency) according to 6-40. This reselection priority is used for a maximum of 300 seconds, or until new information of NSAG(s) and their priorities are received from NAS. The UE may ensure the cell reselection criteria above are fulfilled based on newly derived priorities.

In step 6-55, the UE 6-01 in the RRC idle mode or RRC inactive state receives system information (e.g., MIB or SIB1) broadcast in a candidate target cell before finally reselecting the candidate target cell, and determines whether the reception level (Srxlev) and reception quality (Squal) of the candidate target cell satisfy the above-disclosed S-criterion expression, i.e., Srxlev>0 AND Squal>0, based on the received system information. When the S-criterion expression is satisfied and the candidate target cell is suitable, the UE may reselect the candidate target cell.

Figure 7A:
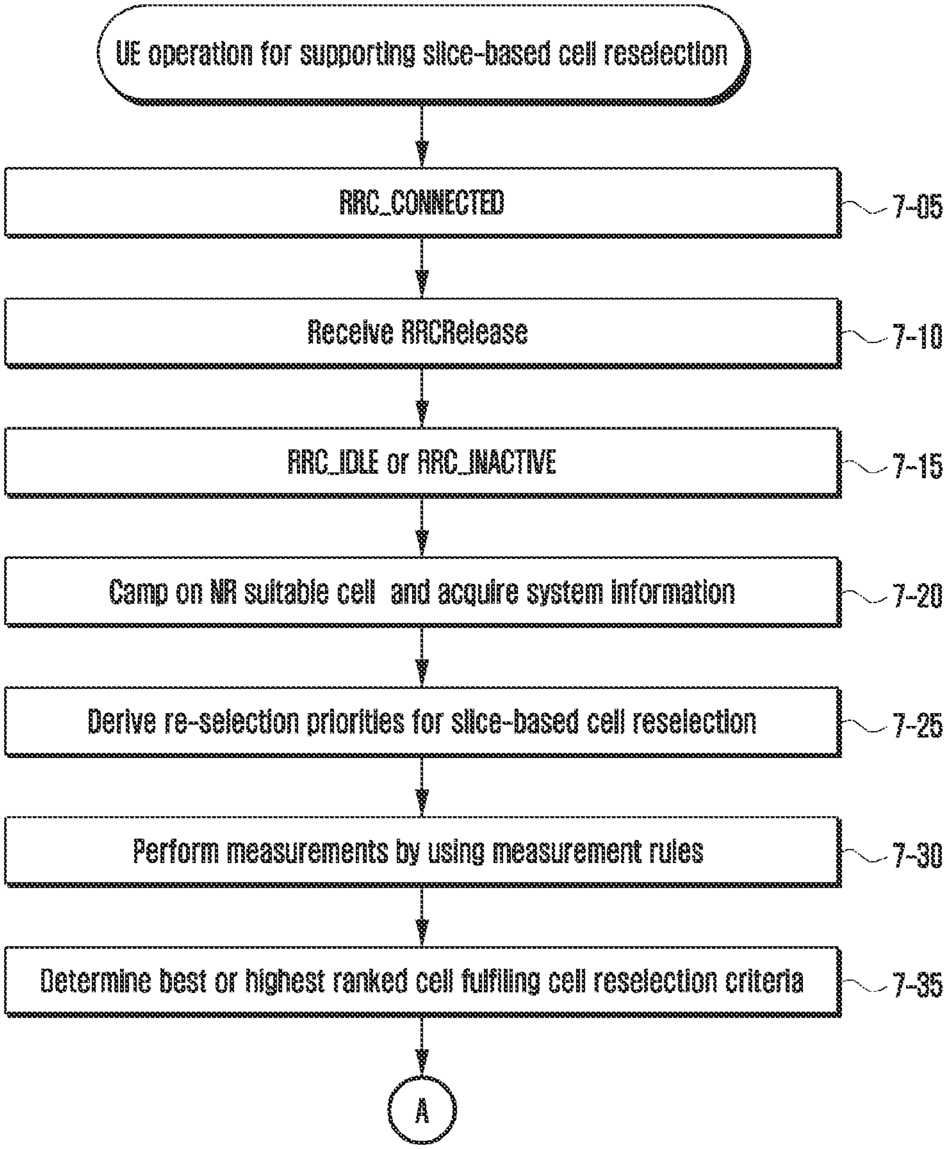
FIG. 7A illustrates a UE supporting slice-based cell reselection re-deriving a re-selection priority in a next-generation mobile communication system according to an embodiment.
Figure 7B:
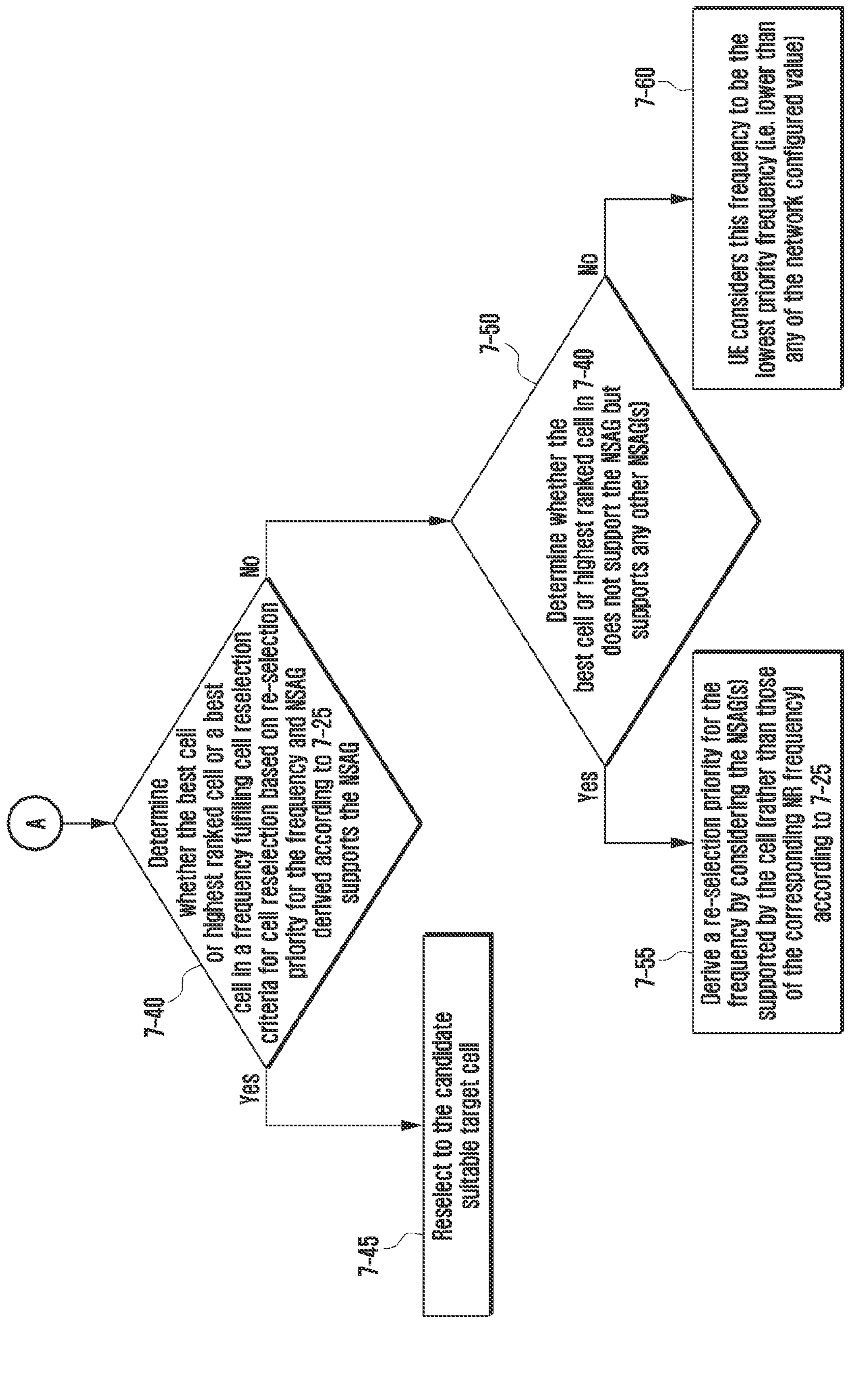
FIG. 7B illustrates a UE supporting slice-based cell reselection re-deriving a re-selection priority in a next-generation mobile communication system according to an embodiment.

FIG. 7A illustrates a UE supporting slice-based cell reselection re-deriving a re-selection priority in a next-generation mobile communication system according to an embodiment, and FIG. 7B illustrates a UE supporting slice-based cell reselection re-deriving a re-selection priority in a next-generation mobile communication system according to an embodiment.

Referring to FIGS. 7A and 7B, the UE supporting slice-based cell reselection may configure an RRC connection with an NR base station and be in RRC connected mode (RRC_CONNECTED) (7-05). The UE may transmit a UE capability information message (UECapabilityInformation) containing information indicating that slice-based cell reselection is supported to the NR base station according to the embodiment in FIG. 6.

In step 7-10, the UE may receive the RRCRelease message from the NR base station including the cellReselectionPriorities. When a t320 value is included in the message and the T320 timer is running or when the t320 value is not included in the message, the UE may perform a cell reselection evaluation procedure by applying the cellReselectionPriorities information. For example, the UE may disregard cellReselectionPriorities information broadcast in system information. When the message does not include the cellReselectionPriorities information, when the T320 timer expires, or when the cellReselectionPriorities is released, the UE may perform a cell reselection evaluation procedure by applying cellReselectionPriorities information broadcast in system information.

In step 7-15, the UE may transition to the RRC_IDLE or RRC_INACTIVE mode. For example, when the RRC connection release message received in step 7-10 includes the suspend configuration information (suspendConfig), the UE may transition to the RRC inactive mode, and otherwise transition to the RRC idle mode.

In step 7-20, the UE may camp on an NR suitable cell to obtain system information containing cell reselection information. The system information may refer to MIB, SIB1, SIB2, SIB3, SIB4, SIB5, and SIB16.

In step 7-25, the UE may derive a reselection priority according to the above-described embodiment in FIG. 6 for slice-based cell reselection. As an example, the UE may derive the reselection priority according to the following predetermined rule.

- Frequencies that support at least one prioritized NSAG received from NAS have higher re-selection priority than frequencies that support none of the NSAG(s) received from NAS.
- Frequencies that support at least one NSAG provided by NAS are prioritized in the order of the NAS-provided priority for the NSAG with highest priority supported on the frequency.
- Among the frequencies (one or multiple) that support the highest prioritized NSAG(s) with the same NAS-provided priorities, the frequencies are prioritized in the order of their highest nsag-CellReselectionPriority or nsag-CellReselectionSubPriority or sum of their highest nsag-CellReselectionPriority and nsag-CellReselectionSubPriority given for these NSAG(s).
- Frequencies that support an NSAG provided by NAS and that indicate nsag-CellReselectionPriority (e.g., it is greater than 0) and/or nsag-CellReselectionSubPriority (e.g., it is greater than 0) for the NSAG have higher re-selection priority than frequencies that support this prioritized NSAG without indicating nsag-CellReselectionPriority and/or nsag-CellReselectionSubPriority for the NSAG.
- Frequencies that support none of the NSAG(s) provided by NAS are prioritized in the order of their cellReselectionPriority or in the order of their sum of cellReselectioPriority and cellReselectionSubPriority.

In step 7-30, the UE may perform frequency measurement by using a measurement rule described in FIG. 6.

In step 7-35, the UE may determine to reselect a cell that satisfies cell reselection criteria. As described in FIG. 6, a specific cell (a best cell or highest ranked cell) that satisfies the cell reselection criteria may be derived.

In step 7-40, the UE performing slice-based cell reselection may determine whether the best cell or the highest ranked cell in a frequency fulfilling the cell reselection criteria for cell reselection based on re-selection priority for the frequency and NSAG derived according to step 7-25 supports the NSAG or not. The UE may determine whether the best or highest ranked cell supports the NSAG by considering a cell on an NR frequency to support all slices of an NSAG if the corresponding nsag-ID is indicated for the NR frequency and valid for current TA; and the cell is either listed in the sliceAllowedCellListNR (if provided in the used slice specific cell reselection information) or the cell is not listed in the sliceExcludedCellListNR (if provided in the used slice specific cell reselection information), or neither sliceAllowedCellListNR nor sliceExcludedCellListNR is configured in the used slice specific cell reselection information.

In step 7-45, when it is determined that the best or highest ranked cell) supports the NSAG in step 7-40, the UE performing slice-based cell reselection may reselect a suitable candidate target cell described in FIG. 6.

In step 7-50, when it is determined that the best or highest ranked cell does not support the NSAG in step 7-40, the UE performing slice-based cell reselection may determine whether other NSAG(s) are supported in the cell according to the above conditions.

In step 7-55, when it is determined that the best or highest ranked cell supports other NSAG(s) in step 7-50, the UE performing slice-based cell reselection may re-derive a reselection priority by considering the NSAG(s) supported by the cell according to step 7-25. The re-derived reselection priority may be used for a maximum of 300 seconds or until new NSAG information and priority values for each NSAG are received from the NAS.

In step 7-60, when it is determined that the best or highest ranked cell does not support other NSAG(s) in step 7-50, the UE performing slice-based cell reselection may set the frequency in which the cell operates to the lowest priority. (the UE may consider this frequency to be lower than any of the network configured values. The re-derived reselection priority may be used for a maximum of 300 seconds or until new NSAG information and priority values for each NSAG are received from the NAS.

The embodiment in FIGS. 7A and 7B discloses a method for a UE performing slice-based reselection to re-derive a reselection priority of a corresponding frequency, when a specific cell (a best or highest ranked cell) in a frequency that fulfils the cell reselection criteria based on the reselection priority derived in consideration of NSAG does not support the NSAG. For example, when the corresponding cell does not support all NSAGs received from the NAS, the UE may set the first frequency in which the corresponding cell operates as the lowest reselection priority. As a result, when a cell operating in a different frequency (e.g., the second frequency) does not satisfy a series of conditions and is not subject to reselection, the UE may reselect a cell at the first frequency set to the lowest reselection priority. In this case, when set to the lowest reselection priority, the UE may not consider the NSAG as corresponding to the first frequency. Alternatively, because another best or highest ranked cell that satisfies the cell reselection criteria at the frequency set by the UE as the lowest reselection priority (e.g., the first frequency) may be a cell supporting the corresponding NSAG, the UE may consider NSAG for the first frequency. That is, the following is performed by the UE.

For a UE performing slice-based cell reselection if a specific cell (a best or highest ranked cell) in a frequency fulfils the above criteria for cell reselection based on re-selection priority for the frequency and NSAG derived according to the standard, but this cell does not support the NSAG and instead, supports any other NSAG(s), the UE may re-derive a re-selection priority for the frequency by considering the NSAG(s) supported by this cell (rather than those of the corresponding NR frequency) according to the standard. Otherwise, the UE may consider this frequency to be lower than any of the network configured value. This reselection priority is used for a maximum of 300 seconds, or until new information of NSAG(s) and their priorities are received from NAS. UE may ensure the cell reselection criteria above are fulfilled based on the newly derived priorities.

Figure 8A:
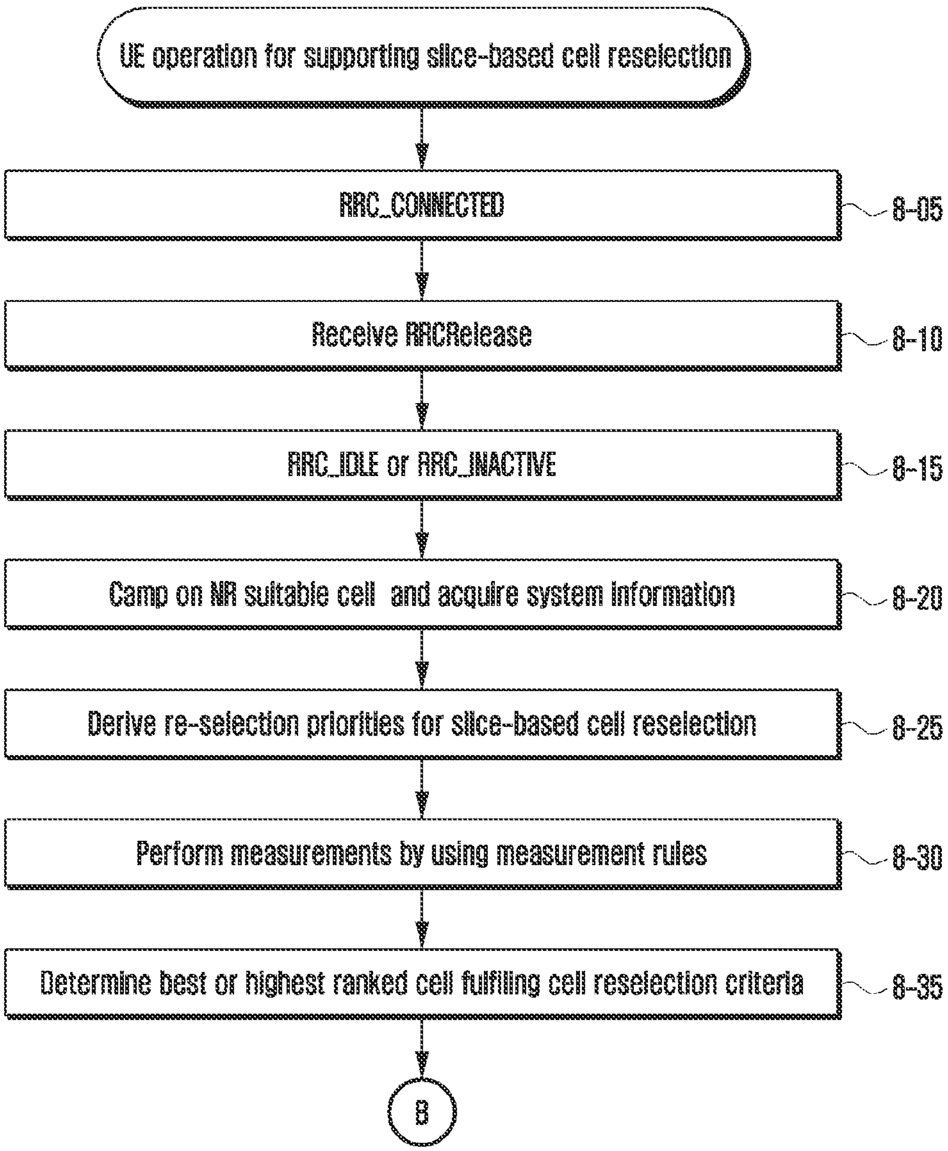
FIG. 8A illustrates a UE supporting slice-based cell reselection re-deriving a re-selection priority in a next-generation mobile communication system according to an embodiment.
Figure 8B:
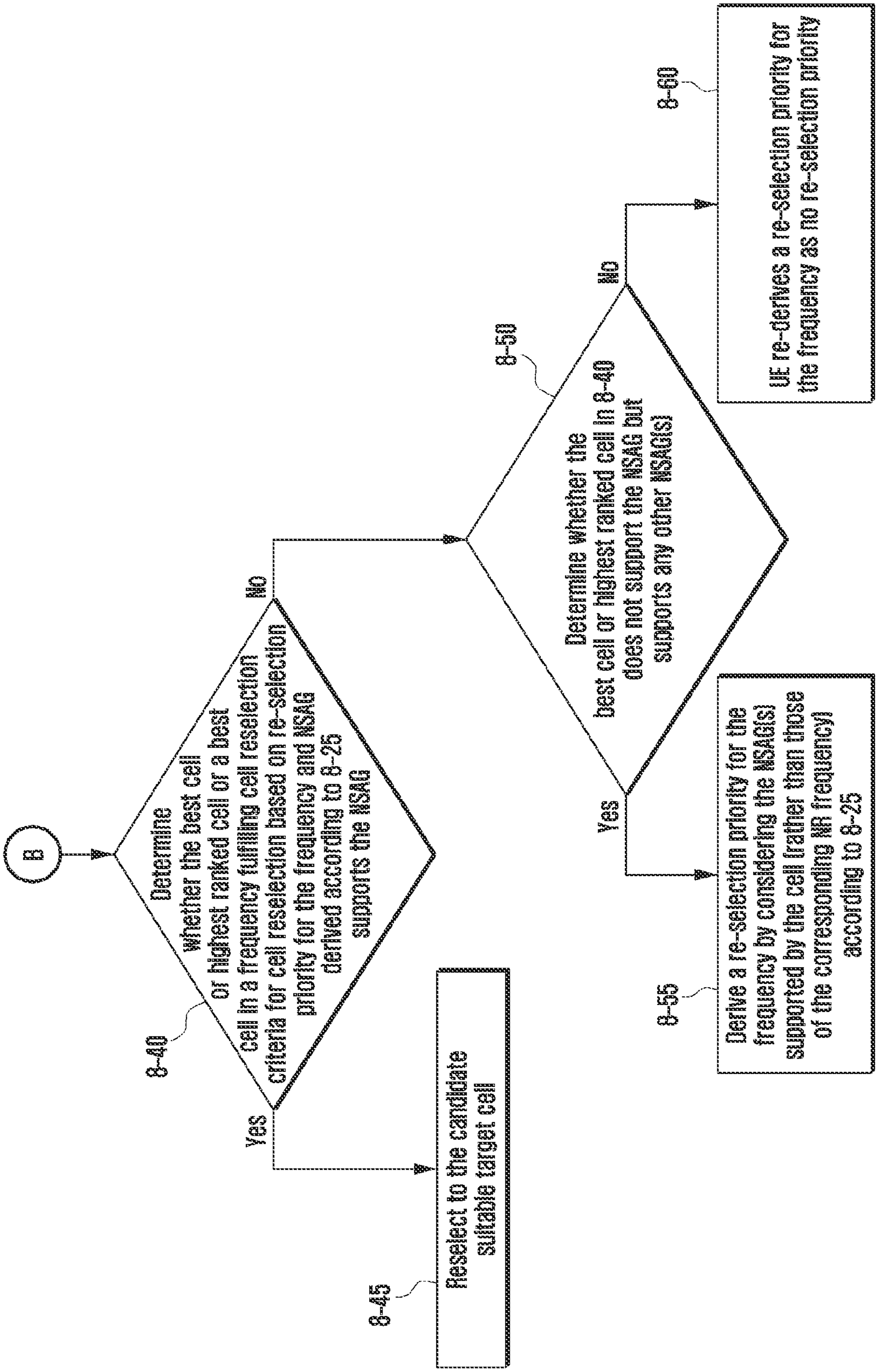
FIG. 8B illustrates a UE supporting slice-based cell reselection re-deriving a re-selection priority in a next-generation mobile communication system according to an embodiment.

FIG. 8A illustrates a UE supporting slice-based cell reselection re-deriving a re-selection priority in a next-generation mobile communication system according to an embodiment, and FIG. 8B illustrates a UE supporting slice-based cell reselection re-deriving a re-selection priority in a next-generation mobile communication system according to an embodiment.

Referring to FIGS. 8A and 8B, the UE supporting slice-based cell reselection may configure an RRC connection with an NR base station and be in RRC connected mode (RRC_CONNECTED) (8-05). The UE may transmit a UE capability information message (UECapabilityInformation) containing information indicating that slice-based cell reselection is supported to the NR base station described in FIG. 6.

In step 8-10, the UE may receive the RRCRelease message from the NR base station. Described in FIG. 6, the message may include the cellReselectionPriorities. When the message includes the cellReselectionPriorities information, and when t320 value is included in the message and the T320 timer is running or when the t320 value is not included in the message, the UE may perform a cell reselection evaluation procedure by applying the cellReselectionPriorities information. For example, the UE may disregard cellReselectionPriorities information broadcast in system information. When the message does not include the cellReselectionPriorities information, when the T320 timer expires, or when the cellReselectionPriorities is released, the UE may perform a cell reselection evaluation procedure by applying cellReselectionPriorities information broadcast in system information.

In step 8-15, the UE may transition to the RRC_IDLE or RRC_INACTIVE mode. For example, when the RRC connection release message received in step 8-10 includes the suspend configuration information (suspendConfig), the UE may transition to the RRC inactive mode, and otherwise transition to the RRC idle mode.

In step 8-20, the UE may camp on an NR suitable cell to obtain system information containing cell reselection information. The system information may refer to MIB, SIB1, SIB2, SIB3, SIB4, SIB5, and SIB16.

In step 8-25, the UE may derive a reselection priority described in FIG. 6 for slice-based cell reselection according to the following predetermined rule.

- Frequencies that support at least one prioritized NSAG received from NAS have higher re-selection priority than frequencies that support none of the NSAG(s) received from NAS.
- Frequencies that support at least one NSAG provided by NAS are prioritized in the order of the NAS-provided priority for the NSAG with highest priority supported on the frequency.
- Among the frequencies (one or multiple) that support the highest prioritized NSAG(s) with the same NAS-provided priorities, the frequencies are prioritized in the order of their highest nsag-CellReselectionPriority or nsag-CellReselectionSubPriority or sum of their highest nsag-CellReselectionPriority and nsag-CellReselectionSubPriority given for these NSAG(s).
- Frequencies that support an NSAG provided by NAS and that indicate nsag-CellReselectionPriority (e.g., it is greater than 0) and/or nsag-CellReselectionSubPriority (e.g., it is greater than 0) for the NSAG have higher re-selection priority than frequencies that support this prioritized NSAG without indicating nsag-CellReselectionPriority and/or nsag-CellReselectionSubPriority for the NSAG.
- Frequencies that support none of the NSAG(s) provided by NAS are prioritized in the order of their cellReselectionPriority or in the order of their sum of cellReselectioPriority and cellReselectionSubPriority.

In step 8-30, the UE may perform frequency measurement by using a measurement rule described in FIG. 6.

In step 8-35, the UE may determine to reselect a cell that satisfies cell reselection criteria. As described in FIG. 6, a specific cell (a best or highest ranked cell) that satisfies the cell reselection criteria may be derived.

In step 8-40, the UE performing slice-based cell reselection may determine whether the best cell or the highest ranked cell in a frequency fulfilling the cell reselection criteria for cell reselection based on re-selection priority for the frequency and NSAG derived according to step 8-25 supports the NSAG. The UE may determine whether the best or highest ranked cell supports the NSAG according to the following condition.

The UE considers a cell on an NR frequency to support all slices of an NSAG if the corresponding nsag-ID is indicated for the NR frequency and valid for current TA; and the cell is either listed in the sliceAllowedCellListNR (if provided in the used slice specific cell reselection information) or the cell is not listed in the sliceExcludedCellListNR (if provided in the used slice specific cell reselection information), or neither sliceAllowedCellListNR nor sliceExcludedCellListNR is configured in the used slice specific cell reselection information.

In step 8-45, when it is determined that the best or highest ranked cell supports the NSAG in step 8-40, the UE performing slice-based cell reselection may reselect a suitable candidate target cell described in FIG. 6.

In step 8-50, when it is determined that the best or highest ranked cell does not support the NSAG in step 8-40, the UE performing slice-based cell reselection may determine whether other NSAG(s) are supported in the cell according to the above conditions.

In step 8-55, when it is determined that the best or highest ranked cell supports other NSAG(s) in step 8-50, the UE performing slice-based cell reselection may re-derive a reselection priority by considering the NSAG(s) supported by the cell according to step 8-25. The re-derived reselection priority may be used for a maximum of 300 seconds or until new NSAG information and priority values for each NSAG are received from the NAS.

In step 8-60, when it is determined that the best or highest ranked cell does not support other NSAG(s) in step 8-50, the UE performing slice-based cell reselection may be set such that there is no priority of the frequency in which the cell operates. (the UE may re-derive a re-selection priority for the frequency as no re-selection priority). The re-derived reselection priority may be used for a maximum of 300 seconds or until new NSAG information and priority values for each NSAG are received from the NAS. When the corresponding cell belongs to the serving frequency, the UE may set the corresponding frequency to the lowest reselection priority since other frequencies may be managed as a frequency having a higher priority.

FIGS. 8A and 8B disclose a method for a UE performing slice-based reselection to re-derive a reselection priority of a corresponding frequency, when a specific cell (a best or highest ranked cell) in a frequency that fulfils the cell reselection criteria based on the reselection priority derived in consideration of NSAG does not support the NSAG. For example, when the corresponding cell does not support all NSAGs received from the NAS, the UE has a feature of setting that there is no reselection priority of the frequency in which the corresponding cell operates. Accordingly, the UE has an advantage of being able to reselect a cell supporting NSAG through a different frequency. In relation to this, the operation of the UE may be expressed as follows.

For a UE performing slice-based cell reselection if a specific cell (a best or highest ranked cell) in a frequency fulfils the above criteria for cell reselection based on re-selection priority for the frequency and NSAG derived according to the standard, but this cell does not support the NSAG and does support any other NSAG(s), the UE may re-derive a re-selection priority for the frequency by considering the NSAG(s) supported by this cell rather than those of the corresponding NR frequency. Otherwise, the UE may consider this frequency to be lower than any of the network configured values. This reselection priority is used for a maximum of 300 seconds, or until new information of NSAG(s) and their priorities are received from NAS. The UE may ensure the cell reselection criteria above are fulfilled based on the newly derived priorities.

Figure 9A:
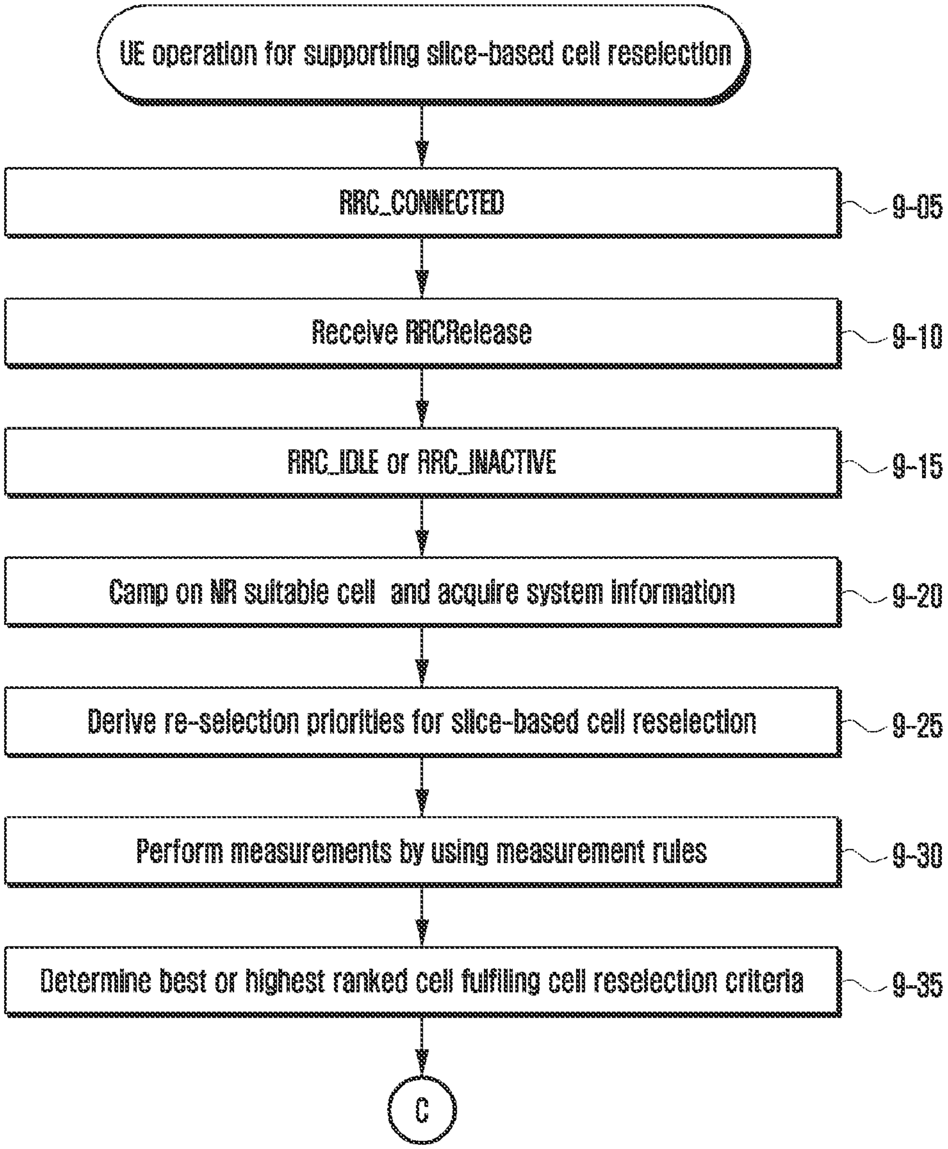
FIG. 9A illustrates a UE supporting slice-based cell reselection re-deriving a re-selection priority in a next-generation mobile communication system according to an embodiment.
Figure 9B:
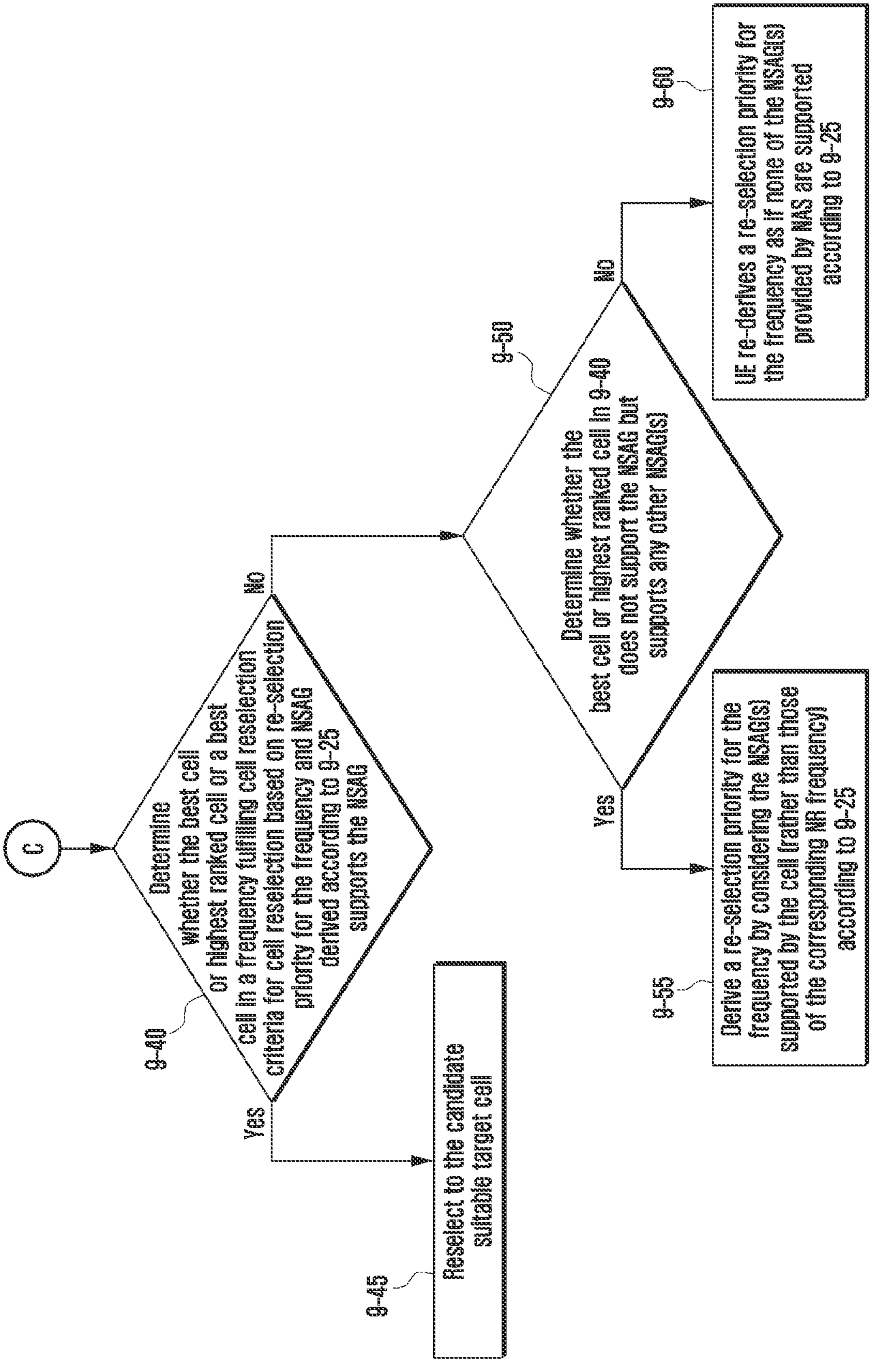
FIG. 9B illustrates a UE supporting slice-based cell reselection re-deriving a re-selection priority in a next-generation mobile communication system according to an embodiment.

FIG. 9A illustrates a UE supporting slice-based cell reselection re-deriving a re-selection priority in a next-generation mobile communication system according to an embodiment, and FIG. 9B illustrates a UE supporting slice-based cell reselection re-deriving a re-selection priority in a next-generation mobile communication system according to an embodiment.

Referring to FIGS. 9A and 9B, in step 9-05, the UE supporting slice-based cell reselection may configure an RRC connection with an NR base station and be in RRC connected mode (RRC_CONNECTED). The UE may transmit a UE capability information message (UECapabilityInformation) containing information indicating that slice-based cell reselection is supported to the NR base station.

In step 9-10, the UE may receive the RRCRelease message from the NR base station. Described in FIG. 6, the message may include cell reselection priority(ies) configuration information (interchangeably referred to as cellReselectionPriority or cellReselectionPriorities information). When a t320 value is included in the message and the T320 timer is running or when the t320 value is not included in the message, the UE may perform a cell reselection evaluation procedure by applying the cellReselectionPriorities information. For example, the UE may disregard cellReselectionPriorities information broadcast in system information. When the message does not include the cellReselectionPriorities information, when the T320 timer expires, or when the cellReselectionPriorities information in the RRCRelease message is released, the UE may perform a cell reselection evaluation procedure by applying cellReselectionPriorities broadcast in system information.

In step 9-15, the UE may transition to the RRC_IDLE or RRC_INACTIVE mode. For example, when the RRC connection release message received in step 9-10 includes the suspend configuration information (suspendConfig), the UE may transition to the RRC inactive mode, and otherwise transition to the RRC idle mode.

In step 9-20, the UE may camp on an NR suitable cell to obtain system information containing cell reselection information. The system information may refer to MIB, SIB1, SIB2, SIB3, SIB4, SIB5, and SIB16.

In step 9-25, the UE may derive a reselection priority described in FIG. 6 for slice-based cell reselection according to the following predetermined rule.

Frequencies that support at least one prioritized NSAG received from NAS have higher re-selection priority than frequencies that support none of the NSAG(s) received from NAS.

Frequencies that support at least one NSAG provided by NAS are prioritized in the order of the NAS-provided priority for the NSAG with highest priority supported on the frequency.

Among the frequencies (one or multiple) that support the highest prioritized NSAG(s) with the same NAS-provided priorities, the frequencies are prioritized in the order of their highest nsag-CellReselectionPriority or nsag-CellReselectionSubPriority or sum of their highest nsag-CellReselectionPriority and nsag-CellReselectionSubPriority given for these NSAG(s).

Frequencies that support an NSAG provided by NAS and that indicate nsag-CellReselectionPriority (e.g., it is greater than 0) and/or nsag-CellReselectionSubPriority (e.g., it is greater than 0) for the NSAG have higher re-selection priority than frequencies that support this prioritized NSAG without indicating nsag-CellReselectionPriority and/or nsag-CellReselectionSubPriority for the NSAG.

Frequencies that support none of the NSAG(s) provided by NAS are prioritized in the order of their cellReselectionPriority or in the order of their sum of cellReselectioPriority and cellReselectionSubPriority.

In step 9-30, the UE may perform frequency measurement by using a measurement rule described in FIG. 6.

In step 9-35, the UE may determine to reselect a cell that satisfies cell reselection criteria. Described in FIG. 6, a specific cell (a best or highest ranked cell) that satisfies the cell reselection criteria may be derived.

In step 9-40, the UE performing slice-based cell reselection may determine whether the best cell or the highest ranked cell in a frequency fulfilling the cell reselection criteria for cell reselection based on re-selection priority for the frequency and NSAG derived according to step 9-25 supports the NSAG. The UE may determine whether the best or highest ranked cell supports the NSAG by considering a cell on an NR frequency to support all slices of an NSAG if the corresponding nsag-ID is indicated for the NR frequency and valid for current TA; and the cell is either listed in the sliceAllowedCellListNR (if provided in the used slice specific cell reselection information) or the cell is not listed in the sliceExcludedCellListNR (if provided in the used slice specific cell reselection information), or neither sliceAllowedCellListNR nor sliceExcludedCellListNR is configured in the used slice specific cell reselection information.

In step 9-45, when it is determined that the best or highest ranked cell supports the NSAG in step 9-40, the UE performing slice-based cell reselection may reselect a suitable candidate target cell described in FIG. 6.

In step 9-50, when it is determined that the best or highest ranked cell does not support the NSAG in step 9-40, the UE performing slice-based cell reselection may determine whether other NSAG(s) are supported in the cell according to the above conditions.

In step 9-55, when it is determined that the best or highest ranked cell supports other NSAG(s) in step 9-50, the UE performing slice-based cell reselection may re-derive a reselection priority by considering the NSAG(s) supported by the cell according to step 9-25. The re-derived reselection priority may be used for a maximum of 300 seconds or until new NSAG information and priority values for each NSAG are received from the NAS.

In step 9-60, when it is determined that the best or highest ranked cell does not support any other NSAG(s) in step 9-50, the UE performing slice-based cell reselection considers that the frequency does not support all NSAG(s) provided from the NAS and derives a reselection priority of the frequency according to 9-25. (the UE may re-derive a re-selection priority for the frequency as if none of the NSAG(s) provided by NAS are supported according to 9-25). For example, the reselection priority of the frequency may be derived based on the conventional cell reselection priority (i.e., cell reselection priority per frequency that is not for slicing). The re-derived reselection priority may be used for a maximum of 300 seconds or until new NSAG information and priority values for each NSAG are received from the NAS.

FIGS. 9A and 9B disclose a method for a UE performing slice-based reselection to re-derive a reselection priority of a corresponding frequency, when a specific cell (a best or highest ranked cell) in a frequency that fulfils the cell reselection criteria based on the reselection priority derived in consideration of NSAG does not support the NSAG. For example, when the corresponding cell does not support all NSAGs received from the NAS, the UE may re-derive the reselection priority of the corresponding frequency based on the conventional cell reselection priority information on the reselection priority of the frequency in which the corresponding cell operates. Accordingly, the UE has an advantage of being able to reselect a cell in the corresponding frequency when the cell reselection is not possible through another frequency.

Relatedly, for a UE performing slice-based cell reselection if a specific cell (a best or highest ranked cell) in a frequency fulfils the above criteria for cell reselection based on re-selection priority for the frequency and NSAG derived according to the standard, but this cell does not support the NSAG and instead, does support any other NSAG(s), the UE may re-derive a re-selection priority for the frequency by considering the NSAG(s) supported by this cell (rather than those of the corresponding NR frequency) according to the standard. Otherwise, the UE may consider this frequency to be lower than any of the network configured values. This reselection priority is used for a maximum of 300 seconds, or until new information of NSAG(s) and their priorities are received from NAS. UE may ensure the cell reselection criteria above are fulfilled based on the newly derived priorities.

Figure 10:
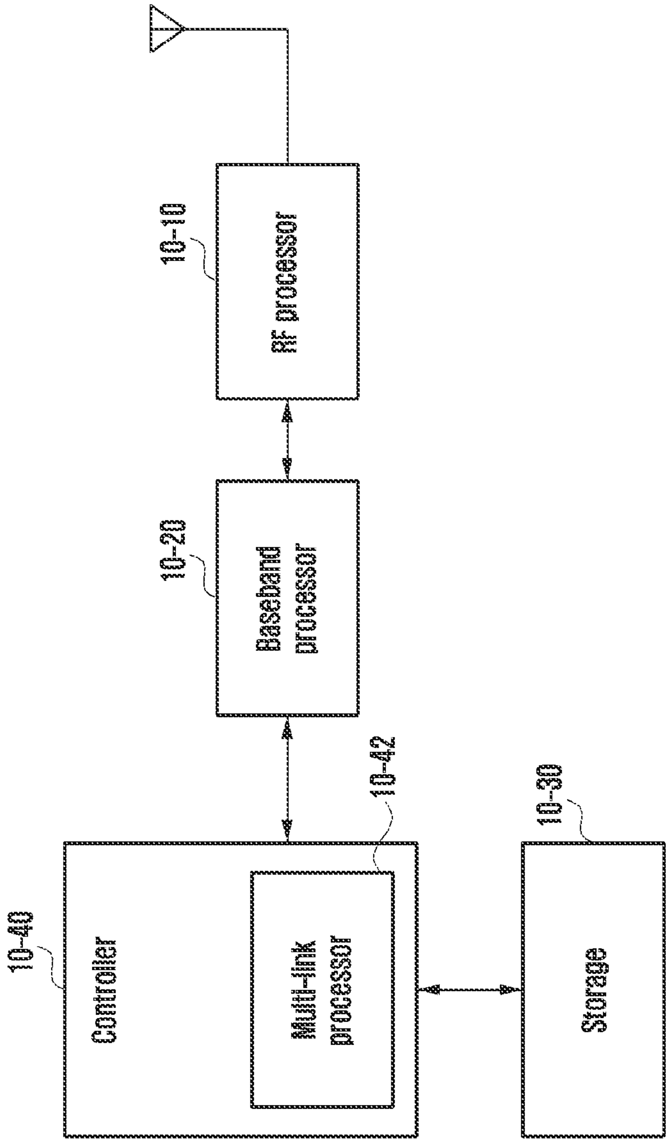
FIG. 10 illustrates the internal structure of a UE according to an embodiment.

FIG. 10 illustrates the internal structure of a UE according to an embodiment.

In FIG. 10, the UE includes a radio frequency (RF) processor 10-10, a baseband processor 10-20, a storage 10-30, and a controller 10-40.

The RF processor 10-10 performs a function for transmitting and receiving a signal through a radio channel, such as band conversion and amplification of a signal. That is, the RF processor 10-10 up-converts a baseband signal provided from the baseband processor 10-20 into an RF band signal, transmits the RF band signal through an antenna, and down-converts the RF band signal received through the antenna to the baseband signal. For example, the RF processor 10-10 may include a transmission filter, a reception filter, an amplifier, a mixer, an oscillator, a digital to analog converter (DAC), an analog to digital converter (ADC), etc. In FIG. 10, only one antenna is illustrated, but the UE may include a plurality of antennas. In addition, the RF processor 10-10 may include a plurality of RF chains and may perform beamforming. For the beamforming, the RF processor 10-10 may adjust the phase and magnitude of each of signals transmitted and received through a plurality of antennas or antenna elements. In addition, the RF processor 10-10 may perform MIMO, and may receive multiple layers when performing the MIMO operation.

The baseband processor 10-20 performs a function of converting between a baseband signal and a bit stream according to a physical layer standard of the system. For example, when transmitting data, the baseband processor 10-20 generates complex symbols by encoding and modulating a transmitted bit stream. In addition, when receiving data, the baseband processor 10-20 restores a received bit stream by demodulating and decoding the baseband signal provided from the RF processor 10-10. For example, when following an OFDM scheme, when transmitting data, the baseband processor 10-20 generates complex symbols by encoding and modulating a transmitted bit stream, maps the complex symbols to subcarriers, and then configures OFDM symbols through an inverse fast Fourier transform (IFFT) operation and cyclic prefix (CP) insertion. In addition, when receiving data, the baseband processor 10-20 divides the baseband signal provided from the RF processor 10-10 into OFDM symbol units, restores signals mapped to subcarriers through a fast Fourier transform (FFT) operation, and then restores a received bit stream through demodulation and decoding.

The baseband processor 10-20 and the RF processor 10-10 transmit and receive signals as described above. Accordingly, the baseband processor 10-20 and the RF processor 10-10 may be referred to as a transmitter, a receiver, a transceiver, or a communicator. At least one of the baseband processor 10-20 and the RF processor 10-10 may include a plurality of communication modules to support a plurality of different radio access technologies. In addition, at least one of the baseband processor 10-20 and the RF processor 10-10 may include different communication modules to process signals of different frequency bands. For example, the different radio access technologies may include a wireless LAN (e.g., IEEE 802.11), a cellular network (e.g., LTE), or the like. The different frequency bands may include a super high frequency (SHF) (e.g., 2.5 GHz, 5 Ghz) band and a millimeter wave (e.g., 60 GHz) band.

The storage 10-30 stores data such as a basic program, an application program, and configuration information for the operation of the UE. In particular, the storage 10-30 may store information related to a second access node performing wireless communication by using the second radio access technology, and provides stored data according to the request of the controller 10-40.

The controller 10-40 controls overall operations of the UE. The controller 10-40 may include a multi-link processor 10-42. For example, the controller 10-40 transmits and receives signals through the baseband processor 10-20 and the RF processor 10-10, writes data in the storage 10-30 and reads the data. To this end, the controller 10-40 may include at least one of a communication processor (CP) that controls for communication and an application processor (AP) that controls an upper layer such as an application program.

Figure 11:
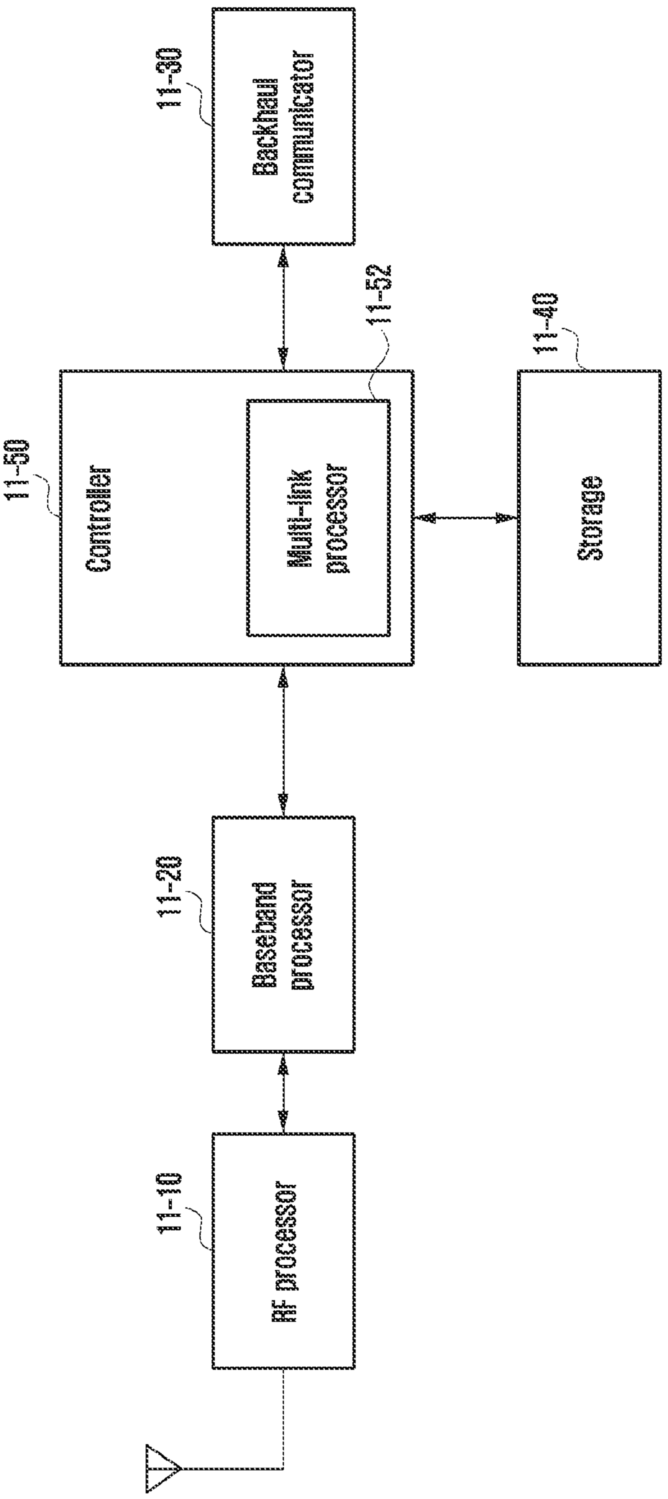
FIG. 11 illustrates the configuration of an NR base station according to an embodiment.

FIG. 11 illustrates the configuration of an NR base station according to an embodiment.

In FIG. 11, the base station includes an RF processor 11-10, a baseband processor 11-20, a backhaul communicator 11-30, a storage 11-40, and a controller 11-50.

The RF processor 11-10 performs a function for transmitting and receiving a signal through a radio channel, such as band conversion and amplification of the signal. That is, the RF processor 11-10 up-converts the baseband signal provided from the baseband processor 11-20 into an RF band signal, transmits the same through an antenna, and down-converts the RF band signal received through the antenna into a baseband signal. The RF processor 11-10 may include a transmission filter, a reception filter, an amplifier, a mixer, an oscillator, a DAC, an ADC, and the like. The first access node may include a plurality of antennas and the RF processor 11-10 may include a plurality of RF chains and may perform beamforming. For the beamforming, the RF processor 11-10 may adjust the phase and magnitude of each of signals transmitted and received through a plurality of antennas or antenna elements. The RF processor may perform a downlink MIMO operation by transmitting one or more layers.

The baseband processor 11-20 performs a function of converting between a baseband signal and a bit stream according to the physical layer standard of the first radio access technology. For example, when transmitting data, the baseband processor 11-20 generates complex symbols by encoding and modulating a transmitted bit stream. When receiving data, the baseband processor 11-20 restores a received bit stream through demodulating and decoding the baseband signal provided from the RF processor 11-10. For example, when following the OFDM scheme and transmitting data, the baseband processor 11-20 generates complex symbols by encoding and modulating a transmitted bit stream, maps the complex symbols to subcarriers, and then configures OFDM symbols through IFFT operation and CP insertion. When receiving data, the baseband processor 11-20 divides the baseband signal provided from the RF processor 11-10 into OFDM symbol units, restores signals mapped to subcarriers through FFT operation, and then restores a received bit stream through demodulation and decoding. The baseband processor 11-20 and the RF processor 11-10 transmit and receive signals as described above and may be referred to as a transmitter, a receiver, a transceiver, a communicator, or a wireless communicator.

The backhaul communicator 11-30 provides an interface for performing communication with other nodes in the network. That is, the backhaul communicator 11-30 converts a bit stream transmitted from the main base station to an auxiliary base station or a core network, into a physical signal, and converts a physical signal received from the other node into a bit stream.

The storage 11-40 stores data such as a basic program, an application program, and configuration information for the operation of the main base station. In particular, the storage 11-40 may store information on a bearer allocated to an accessed UE, a measurement result reported from the accessed UE, and the like. In addition, the storage 11-40 may store information serving as a criterion for determining whether to provide or stop multiple connections to the UE. In addition, the storage 11-40 provides stored data according to the request of the controller 11-50.

The controller 11-50 controls overall operations of the main base station. The controller 11-50 may include a multi-link processor 11-52. For example, the controller 11-50 transmits and receives signals through the baseband processor 11-20 and the RF processor 11-10 or through the backhaul communicator 11-30. In addition, the controller 11-50 writes data in the storage 11-40 and reads the data. To this end, the controller 11-50 may include at least one processor.

Herein, each block and combinations of blocks in the flowchart illustrations can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur out of order. For example, two blocks shown in succession may in fact be executed substantially concurrently or the blocks may sometimes be executed in the reverse order, depending upon the functionality involved.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a terminal for performing a slice-based cell reselection in a wireless communication system, the method comprising:

deriving at least one reselection priority for the slice-based cell reselection based on information on a network slice access stratum group (NSAG) obtained from a non access stratum (NAS);

in case that a cell in a frequency fulfils cell reselection criteria and does not support the NSAG, identifying whether the cell supports at least one NSAG other than the NSAG; and in case that the cell does not support any NSAG other than the NSAG, rederiving a reselection priority for the frequency as if none of at least one NSAG provided by the NAS is supported.

2. The method of claim 1, wherein the reselection priority for the frequency is rederived based on a cell reselection priority per frequency that is not for slicing.

3. The method of claim 1, wherein the cell is a highest ranked cell in the frequency.

4. The method of claim 1, wherein the cell is a best cell in the frequency.

5. The method of claim 1, wherein the rederived reselection priority for the frequency is used for a maximum of 300 seconds.

6. The method of claim 1, wherein the rederived reselection priority for the frequency is used until new information of at least one NSAG and at least one respective priority is received from the NAS.

7. The method of claim 1, wherein identifying whether the cell supports the NSAG is based on:

an identifier and a tracking area of the NSAG provided by the NAS; and at least one of a slice allowed cell list or a slice excluded cell list, if configured.

8. The method of claim 1, wherein the information on the NSAG is received from an access and mobility function (AMF).

9. A terminal for performing a slice-based cell reselection in a wireless communication system, the terminal comprising:

a transceiver; and a controller coupled with the transceiver and configured to:

derive at least one reselection priority for the slice-based cell reselection based on information on a network slice access stratum group (NSAG) obtained from a non access stratum (NAS), in case that a cell in a frequency fulfils cell reselection criteria and does not support the NSAG, identify whether the cell supports at least one NSAG other than the NSAG, and in case that the cell does not support any NSAG other than the NSAG, rederive a reselection priority for the frequency as if none of at least one NSAG provided by the NAS is supported.

10. The terminal of claim 9, wherein the reselection priority for the frequency is rederived based on a cell reselection priority per frequency that is not for slicing.

11. The terminal of claim 9, wherein the cell is a highest ranked cell in the frequency.

12. The terminal of claim 9, wherein the cell is a best cell in the frequency.

13. The terminal of claim 9, wherein the rederived reselection priority for the frequency is used for a maximum of 300 seconds.

14. The terminal of claim 9, wherein the rederived reselection priority for the frequency is used until new information of at least one NSAG and at least one respective priority is received from the NAS.

15. The terminal of claim 9, wherein identifying whether the cell supports the NSAG is based on:

an identifier and a tracking area of the NSAG provided by the NAS; and at least one of a slice allowed cell list or a slice excluded cell list, if configured.

16. The terminal of claim 9, wherein the information on the NSAG is received from an access and mobility function (AMF).

* * * * *